(12) United States Patent
Okajima et al.

(10) Patent No.: US 10,795,920 B2
(45) Date of Patent: Oct. 6, 2020

(54) INFORMATION PROCESSING DEVICE, INFORMATION PROCESSING METHOD, AND COMPUTER-READABLE STORAGE MEDIUM

(71) Applicant: NEC Solution Innovators, Ltd., Koto-ku, Tokyo (JP)

(72) Inventors: Yuzuru Okajima, Tokyo (JP); Kouichi Maruyama, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 875 days.

(21) Appl. No.: 15/511,696

(22) PCT Filed: Sep. 10, 2015

(86) PCT No.: PCT/JP2015/075747
§ 371 (c)(1),
(2) Date: Mar. 16, 2017

(87) PCT Pub. No.: WO2016/043121
PCT Pub. Date: Mar. 24, 2016

(65) Prior Publication Data
US 2017/0293636 A1    Oct. 12, 2017

(30) Foreign Application Priority Data
Sep. 19, 2014   (JP) .................................. 2014-191102

(51) Int. Cl.
*G06F 16/29*      (2019.01)
*G06F 16/00*      (2019.01)
(Continued)

(52) U.S. Cl.
CPC ............. *G06F 16/29* (2019.01); *G06F 16/00* (2019.01); *G06F 16/2246* (2019.01);
(Continued)

(58) Field of Classification Search
CPC ............. G06F 16/2246; G06F 16/2264; G06F 16/2465; G06F 16/244; G06F 16/29
(Continued)

(56) References Cited

U.S. PATENT DOCUMENTS 10,120,880 B2 * 11/2018 Dorner .................... G06F 16/58
2003/0004938 A1 *  1/2003 Lawder ............... G06F 16/2264
(Continued)

FOREIGN PATENT DOCUMENTS

JP      2010-16050    * 7/2010
JP      2010-160501   * 7/2010
(Continued)

OTHER PUBLICATIONS

Shoji Nishimura et al., "MD-HBase: A Scalable Multi-dimensional Data Infrastructure for Location Aware Services", 2011 IEEE 12th International Conference on Mobile Data Management, Jun. 2011, pp. 7-16, cited in EESR.

(Continued)

*Primary Examiner* — James Trujillo
*Assistant Examiner* — Fariborz Khoshnoodi

(57) ABSTRACT

An information processing device (100) processes a data structure that represents a set of points included in a multidimensional space, and includes: a search unit (10) that, when a particular multidimensional region is specified as a query region, specifies regions that are expressed as portions shared between regions starting with feature value prefixes and regions starting with coordinate prefixes with respect to respective dimensions, and that are included in the query region, and outputs selected sections that are sections included in a data structure corresponding to the specified regions, the feature value prefixes being prefixes obtained from bit representations of feature values of the points, and the coordinate prefixes being prefixes obtained from bit
(Continued)

representations of coordinates of the points with respect to a particular dimension; and an aggregation unit (20) that calculates information regarding a set of points included in the query region, by using the selected sections.

8 Claims, 13 Drawing Sheets

(51) Int. Cl.
　　*G06F 16/22* (2019.01)
　　*G06F 16/242* (2019.01)
　　*G06F 16/2458* (2019.01)
(52) U.S. Cl.
　　CPC ........ *G06F 16/2264* (2019.01); *G06F 16/244* (2019.01); *G06F 16/2465* (2019.01)
(58) Field of Classification Search
　　USPC .................................................. 707/736, 741
　　See application file for complete search history.

(56) References Cited

U.S. PATENT DOCUMENTS

| | | | |
|---|---|---|---|
| 2010/0205181 A1* | 8/2010 | Chidlovskii | G06F 16/29 707/741 |
| 2010/0225913 A1* | 9/2010 | Trainer | G01N 15/0205 356/338 |
| 2014/0029663 A1* | 1/2014 | Su | H04N 19/80 375/240.02 |

FOREIGN PATENT DOCUMENTS

| | | |
|---|---|---|
| JP | 2010-160591 A | 7/2010 |
| WO | 2014/109109 A1 | 7/2014 |

OTHER PUBLICATIONS

Skopal T et al., "A new range query algorithm for Universal B-trees", Information Systems, Sep. 2006, pp. 489-511, vol. 31, No. 6, cited in EESR.
J. K. Lawder et al., "Using Space-Filling Curves for Multi-dimensional Indexing", ECCV 2016 conference, Jan. 2000, pp. 20-35, vol. 1832, cited in EESR.
Pankaj K. Agarwal et al. "Efficient external memory structures for range-aggregate queries", Computational Geometry, Apr. 2013, pp. 358-370, vol. 46, No. 3, cited in EESR.
Extended European Search Report for EP Application No. EP15842969.6 dated Mar. 26, 2018.
Meng He, "Succinct and Implicit Data Structures for Computational Geometry", Lecture Notes in Computer Science vol. 8066 "Space-Efficient Data Structures, Streams, and Algorithms", pp. 216-235, 2013, Springer Berlin Heidelberg.
International Search Report for PCT Application No. PCT/JP2015/075747, dated Dec. 22, 2015.

* cited by examiner

Fig.1

| | | 0<br>"000" | 1<br>"001" | 2<br>"010" | 3<br>"011" | 4<br>"100" | 5<br>"101" | 6<br>"110" | 7<br>"111" |
|---|---|---|---|---|---|---|---|---|---|
| | 0<br>"000" | "000000" | "000001"<br>⓪ | "000100" | "000101" | "010000" | "010001" | "010100" | "010101" |
| | 1<br>"001" | "000010" | "000011" | "000110" | "000111"<br>① | "010010" | "010011" | "010110" | "010111" |
| | 2<br>"010" | "001000" | "001001" | "001100" | "001101" | "011000" | "011001" | "011100" | "011101"<br>③ |
| | 3<br>"011" | "001010" | "001011" | "001110" | "001111" | "011010"<br>② | "011011" | "011110" | "011111" |
| | 4<br>"100" | "100000" | "100001" | "100100" | "100101" | "110000" | "110001" | "110100"<br>⑥ | "110101" |
| | 5<br>"101" | "100010" | "100011"<br>④ | "100110" | "100111" | "110010" | "110011" | "110110" | "110111" |
| | 6<br>"110" | "101000" | "101001" | "101100" | "101101" | "111000" | "111001"<br>⑦ | "111100" | "111101" |
| | 7<br>"111" | "101010"<br>⑤ | "101011" | "101110" | "101111" | "111010" | "111011" | "111110" | "111111" |

Dimension 2 across columns; Dimension 1 down rows. $C(\pi_2)$ spans columns 4–7. $C(\pi_1)$ spans rows 2–3.

$\pi_z = "011***"$
$\pi_1 = "01*"$
$\pi_2 = "1**"$
$[l_{\pi_1}, u_{\pi_1}] = ["010", "011"] = [2,3]$
$[l_{\pi_2}, u_{\pi_2}] = ["100", "111"] = [4,7]$
$C(\pi_z) = [2,3] \times [4,7]$

Fig.4

| i | 0 | 1 | 2 | 3 | 4 | 5 | 6 | 7 |
|---|---|---|---|---|---|---|---|---|
| Z | 1 | 7 | 26 | 29 | 38 | 42 | 52 | 57 |
|   | 0 | 0 | 0 | 0 | 1 | 1 | 1 | 1 |
|   | 0 | 0 | 1 | 1 | 0 | 0 | 1 | 1 |
|   | 0 | 0 | 1 | 1 | 0 | 1 | 0 | 1 |
|   | 0 | 1 | 0 | 1 | 1 | 0 | 1 | 0 |
|   | 0 | 1 | 1 | 0 | 1 | 1 | 0 | 0 |
|   | 1 | 1 | 0 | 1 | 0 | 0 | 0 | 1 |

| i | 0 | 1 | 2 | 3 | 4 | 5 | 6 | 7 |
|---|---|---|---|---|---|---|---|---|
| $P_1$ | 0 | 1 | 3 | 2 | 5 | 7 | 4 | 6 |
|   | 0 | 0 | 0 | 0 | 1 | 1 | 1 | 1 |
|   | 0 | 0 | 1 | 1 | 0 | 1 | 0 | 1 |
|   | 0 | 1 | 1 | 0 | 1 | 1 | 0 | 0 |

| i | 0 | 1 | 2 | 3 | 4 | 5 | 6 | 7 |
|---|---|---|---|---|---|---|---|---|
| $P_2$ | 1 | 3 | 4 | 7 | 2 | 0 | 6 | 5 |
|   | 0 | 0 | 1 | 1 | 0 | 0 | 1 | 1 |
|   | 0 | 1 | 0 | 1 | 1 | 0 | 1 | 0 |
|   | 1 | 1 | 0 | 1 | 0 | 0 | 0 | 1 |

Fig.12

|  | RECTANGULAR RANGE COUNT | | RECTANGULAR RANGE REPORT | |
| --- | --- | --- | --- | --- |
|  | d=2 | d>2 | d=2 | d>2 |
| k-d TREE | $O(\sqrt{n})$ | $O(n^{(d-1)/d})$ | $O(\sqrt{n}+F)$ | $O(n^{(d-1)/d}+F)$ |
| WAVELET TREE | $O(\log n)$ | INAPPLICABLE | $O(\log n + F \log n)$ | INAPPLICABLE |
| PRESENT INVENTION | $O(\log^2 n)$ | $O(n^{(d-2)/d} \log n)$ | $O(\log^2 n + F \log n)$ | $O(n^{(d-2)/d} \log n + F \log n)$ |

# INFORMATION PROCESSING DEVICE, INFORMATION PROCESSING METHOD, AND COMPUTER-READABLE STORAGE MEDIUM

This application is a National Stage Entry of PCT/JP2015/075747 filed on Sep. 10, 2015, which claims priority from Japanese Patent Application 2014-191102 filed on Sep. 19, 2014, the contents of all of which are incorporated herein by reference, in their entirety.

TECHNICAL FIELD

The present invention relates to an information processing device, an information processing method, and a computer-readable storage medium that stores programs for realizing the device and the method, and particularly to an information processing device, an information processing method, and a computer-readable storage medium for efficiently performing a search through multidimensional data.

BACKGROUND ART

Finding points that are included in a specified rectangular range when there are numerous points in a multidimensional space is called "orthogonal range search". For example, when d denotes the number of dimensions, points that exist in a multidimensional space having d dimensions can be expressed by $p=(p_1, p_2, \ldots, p_d)$, using a combination of d coordinates. Here, a range with respect to each dimension k is expressed by $[l_{qk}, u_{qk}]$, and a d-dimensional rectangular range expressed by $Q=[l_{q1}, u_{q1}]\times[l_{q2}, u_{q2}]\times\ldots\times[l_{qd}, u_{qd}]$ is considered. This rectangular range is referred to as a query region, and the aim of the orthogonal range search is to search for points p that are included in this query region Q, namely points p that satisfy $\forall k \in \{1, \ldots, d\}: l_{qk} \leq p_k \leq u_{qk}$.

Such an orthogonal range search plays an important role in applications that handle geographical information, and also in multidimensional data analysis. The following shows specific examples.

For example, the position of a restaurant on a map can be expressed by two-dimensional data "(latitude, longitude)" that is a combination of two values. In this case, by using the orthogonal range search, it is possible to search for all of the restaurants whose latitude is within the range of 138 degrees to 139 degrees and whose longitude is within the range of 35 degrees to 36 degrees.

Also, for example, it is possible to express statistical data regarding employees of a company by using three-dimensional data "(age, body height, annual income)". In this case, by using the orthogonal range search, it is possible to search for all of the employees whose age is within the range of 30 to 40, whose body height is within the range of 170 cm to 180 cm, and whose annual income is within the range of five million yen to six million yen.

Furthermore, there are various variations of an orthogonal range search, which are different in what search results are returned. A report query and an aggregate query are examples of these variations.

First, the report query is an orthogonal range search that returns a list of all of the points that are included in the query region. The number of points that are included in the query region is referred to as a hit count. The report query returns a list having a size that is proportional to the hit count, and therefore the report query is not suitable for analyzing large-scale data for which the hit count is expected to be large. For example, when tens of millions of points are included, the report query outputs all of the tens of millions of points.

Therefore, in cases of large-scale data analysis, the aggregate query that returns the results of aggregation of these points is more important compared to returning a list of all of the points included in the query region. The most representative query among various kinds of aggregate queries is a count query.

The count query is a kind of orthogonal range search that returns the number of points included in the query region. In addition to the count query, when a weight is given to each point, there are, for example: a sum query that returns the sum of the weights of the points that are included in the query region; an average query that returns the average of the weights; a max query that returns the maximum value of the weights.

A k-d tree is known as a representative data structure that can be used for orthogonal range search (for example, see Non-Patent Document 1). The size of a k-d tree can be expressed by O(n), i.e. a linear size. Also, it is known that the worst time complexity of an orthogonal range search using a k-d tree is $O(n^{(d-1)/d})$. Note that n denotes the number of data sets, and d denotes the number of dimensions. The worst time complexity $O(n^{(d-1)/d})$ achieved by using a k-d tree is the best one among the time complexities of conventionally known data structures having a linear size.

If an orthogonal range search is applied to a data structure having a super-linear size that is greater than O(n), it is possible to improve the computation time (the time complexity). An example of a data structure having such a super-linear size is a data structure that is called "range tree".

An orthogonal range search can also be realized by using a two-dimensional data structure that is called "wavelet tree" (for example, see Non-Patent Document 1). If this is the case, a search is performed within a two-dimensional space, and the time complexity is O(log n). Note that the details of the above-described orthogonal range search using a k-d tree and a wavelet tree are described in the Non-Patent Document 1.

CITATION LIST

Non-Patent Document

Non-Patent Document 1: Meng He, "Succinct and Implicit Data Structures for Computational Geometry", Lecture Notes in Computer Science Volume 8066 "Space-Efficient Data Structures, Streams, and Algorithms", pp 216-235, 2013, Springer Berlin Heidelberg, ISBN 978-3-642-40272-2

DISCLOSURE OF THE INVENTION

Problems to be Solved by the Invention

In this way, various data structures are available to realize the orthogonal range search. However, in practice, there are the following problems. First, in the case where orthogonal range search is realized by using a k-d tree, there is a problem in which the achievable worst time complexity $O(n^{(d-1)/d})$ increases along with an increase in either one or both of n, which denotes the number of data sets, and d, which denotes the number of dimensions.

Also, if orthogonal range search is realized by using a data structure having a super-linear size, although it is possible to improve the computation time compared to the case where orthogonal range search is realized by using a k-d tree, there is a problem in which the data structure having the superlinear size is too large in size, and therefore it is difficult and impractical to use the data structure in an actual application.

Furthermore, if orthogonal range search is realized by using a wavelet tree, since a wavelet tree is only applicable to two-dimensional data, there is a problem in which it is impossible to perform a search through a data structure having a desired number of dimensions that is greater than or equal to three.

One example of aims of the present invention is to solve the above-described problems and to provide an information processing device, an information processing method, and a computer-readable storage medium that can realize orthogonal range search with respect to a desired dimension at a higher speed compared to cases of k-d trees, by using a data structure having a linear size.

Means for Solving the Problems

To achieve the above-described aim, an information processing device according to one aspect of the present invention is an information processing device that processes a data structure that represents a set of points included in a multidimensional space, comprising:

a search unit that, when a particular multidimensional region is specified as a query region, specifies, within a multidimensional region that builds up the data structure, regions that are expressed as portions shared between regions starting with feature value prefixes and regions starting with coordinate prefixes with respect to respective dimensions, and that are included in the query region, and outputs selected sections that are sections included in a data structure corresponding to the specified regions, the feature value prefixes being prefixes obtained from bit representations of feature values of the points, and the coordinate prefixes being prefixes obtained from bit representations of coordinates of the points with respect to a particular dimension; and an aggregation unit that calculates information regarding a set of points included in the query region, by using the selected sections.

Also, to achieve the above-described aim, an information processing method according to one aspect of the present invention is an information processing method for processing a data structure that represents a set of points included in a multidimensional space, comprising:

(a) a step of, when a particular multidimensional region is specified as a query region, specifying, within a multidimensional region that builds up the data structure, regions that are expressed as portions shared between regions starting with feature value prefixes and regions respectively starting with coordinate prefixes with respect to dimensions, and that are included in the query region, the feature value prefixes being prefixes obtained from bit representations of feature values of the points, and the coordinate prefixes being prefixes obtained from bit representations of coordinates of the points with respect to a particular dimension;

(b) a step of outputting selected sections that are sections included in a data structure corresponding to the regions specified in the step (a); and (c) a step of calculating information regarding a set of points included in the query region, by using the selected sections.

Furthermore, to achieve the above-described aim, a computer-readable storage medium according to one aspect of the present invention is a computer-readable storage medium that stores a program for causing a computer to perform information processing to process a data structure that represents a set of points included in a multidimensional space, the program causing the computer to execute:

(a) a step of, when a particular multidimensional region is specified as a query region, specifying, within a multidimensional region that builds up the data structure, regions that are expressed as portions shared between regions starting with feature value prefixes and regions respectively starting with coordinate prefixes with respect to dimensions, and that are included in the query region, the feature value prefixes being prefixes obtained from bit representations of feature values of the points, and the coordinate prefixes being prefixes obtained from bit representations of coordinates of the points with respect to a particular dimension;

(b) a step of outputting selected sections that are sections included in a data structure corresponding to the regions specified in the step (a); and (c) a step of calculating information regarding a set of points included in the query region, by using the selected sections.

Effects of the Invention

As described above, according to the present invention, it is possible to realize orthogonal range search with respect to a desired dimension at a higher speed compared to cases of k-d trees, by using a data structure having a linear size.

BRIEF DESCRIPTION OF THE DRAWINGS

FIG. 1 is a diagram showing examples of coordinates in a two-dimensional space and Z-values.

FIG. 4 is a diagram showing examples of Z-value sequences and coordinate sequences used in the embodiment of the present invention.

FIG. 12 is a diagram showing a comparison in terms of time complexity between the present invention and a conventional scheme.

DESCRIPTION OF EMBODIMENTS

Principles of the Invention

Figure 2:
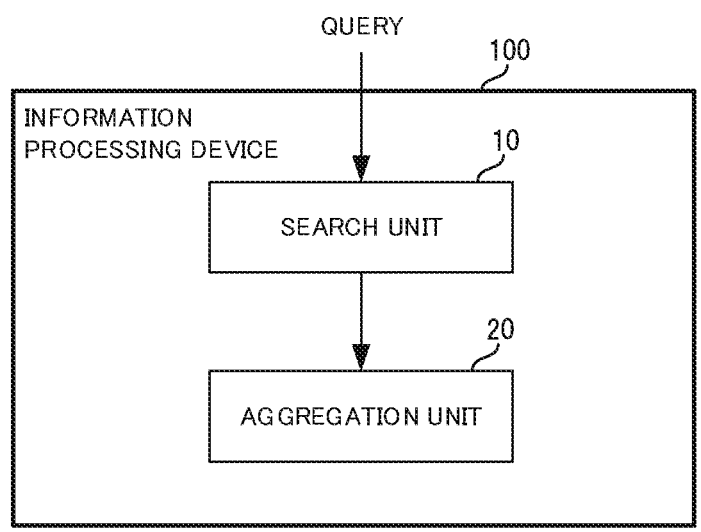
FIG. 2 is a block diagram showing an overall configuration of an information processing device according to an embodiment of the present invention.

First, basic principles of the present invention will be described below, using a typical k-d tree as an example.

First of all, a k-d tree is a binary search tree that is used to handle multidimensional data. A k-d tree is characterized in that the entire space is sequentially divided into two with respect to each dimension from dimension 1 to dimension d. The tree structure of a k-d tree expresses recursive division of a space, and each node of the binary search tree is assigned a partial region. In the present specification, a partial region assigned to a node v is referred to as "the coverage region" of the node.

Furthermore, each node of a k-d tree can retain a statistical amount regarding points that are included in the coverage region of the node. For example, when it is desired to calculate a count query at high speed, the number of points included in the coverage region of each node is stored in the node.

An orthogonal range search using a k-d tree is realized in the following manner. First, regarding the root node that serves as a starting point, it is determined whether or not the coverage region assigned to a child node overlaps the query region. Movement to the child node occurs only if the coverage region overlaps the query region, and such an operation is repeatedly performed. Movement to a child node corresponds to dividing the coverage region into two regions with respect to a particular dimension. If the coverage region assigned to a node is completely included in the query region, a statistical amount stored in the node, regarding the points included in the coverage region, is added to the output result.

In a search using a k-d tree, as described above, a given query region is divided for a plurality of nodes such that the coverage regions are included in the query region, and a search result is obtained by summing the statistical amounts stored in the nodes regarding the points included in the respective coverage regions. The worst time complexity $O(n^{(d-1)/d})$ of a k-d tree expresses the number of nodes required for performing this spatial division. If such an approach in which spatial division is performed with reference to nodes is employed, it is impossible to achieve a time complexity that is better than the worst time complexity $O(n^{(d-1)/d})$.

In contrast, according to the present invention, division is not executed with reference to nodes, but is executed with reference to prefixes to feature values that are calculated based on the coordinates of points that exist in a multidimensional space. More specifically, first, a feature value that is called "Z-value" is defined for each point, and then regions that correspond to the query region and whose feature value starts with a particular prefix are found. Next, in the regions thus found, partial regions that are included in the query region and whose coordinate with respect to a particular dimension starts with a particular prefix are searched for. According to the present invention, such a partial region is not obtained as a node of a tree structure, but is obtained as a section included in a coordinate subsequence corresponding to a node of a tree structure.

As described above, according to the present invention, the query region is not divided with reference to nodes. According to the present invention, the query region is divided by using a set of partial regions that are shared between a coverage region that is defined by the prefix to the feature value of a point and a coverage region that is defined by the prefix to the coordinate of a point with respect to each dimension. As a result, according to the present invention, unlike cases of searching with a k-d tree, it is possible to reduce the time complexity required for dividing the query region, and to realize orthogonal range search at a higher speed than cases of searching with a k-d tree.

Concepts Employed in the Present Specification

The following describes various concepts employed in the present specification. In the present specification, coordinates $p_i$ of all of the points are expressed by integers $[0, n-1]$. Also, these integers are expressed by bits having a binary length $l = \mathrm{ceil}(\log n)$. Note that ceil ( ) denotes a ceiling function. log denotes a binary logarithm function.

For example, when n=8, all coordinates are expressed by integers [0,7], and the binary length l is expressed by l=ceil(log 3) (bits). In other words, the binary length l can be expressed by 0="000", 1="001", 2="010", 3="011", 4="100", 5="101", 6="110", or 7="111".

However, the present invention is also applicable to general multidimensional spaces whose coordinates are not expressed by integers. For example, by employing conversion into a rank space, it is possible to convert n points, where n is a given real number, to integer coordinates within a range $[0, n-1]$, and it is possible to realize an orthogonal range search by using the coordinates. Therefore, by using this conversion into a rank space, it is possible to apply the present invention to general multidimensional spaces that are expressed by real numbers. Note that conversion into a rank space is disclosed in the above-described Non-Patent Document 1, for example.

Also, if values are expressed as binaries composed of "1"s and "0"s, it is possible to employ the present invention even if conversion to a rank space has not been performed. In other words, when the number of data sets is n, the present invention is also applicable to data sets whose coordinates have values that are out of the range $[0, n-1]$. In the present specification, the range of values of coordinates is limited to the range $[0, n-1]$ in order to logically analyze the time complexity. However, in practice, the present invention can be employed without limiting the range of values of coordinates to the range $[0, n-1]$.

Also, in the present specification, a concept that is called "prefix" is used. A prefix is high-order bits taken out from an integer that is expressed as a binary. In the present specification, the prefix to higher-order h bits of an integer is denoted as a combination of 1, 0, and *, where the number of "1"s and "0"s is h in total, and the number of "*"s is l-h. * is a wild card, and indicates that it may be 1 or 0. If an integer starts with a particular prefix, the integer is included in a particular continuous range.

For example, it can be assumed that an integer is expressed by a bit sequence that has a length of l=3. If this is the case, prefix "0*" having a length of 1 corresponds to four values, namely "000", "001", "010", and "011". In other words, the prefix corresponds to a range ["000", "011"]=[0,3], which is the range of integer values. Similarly, prefix "01*" having a length of 2 corresponds to two values, namely "010" and "011", and corresponds to the range of values ["010","011"]=[2,3]. A prefix having a length l (=3) corresponds to only one integer.

In the present specification, the following denotations are used for a sequence. For example, when there is a sequence A having a length of n, A[0] denotes the first element of A, and A[n−1] denotes the last element of A. Also, A[i,j]

denotes a section in A from element A[i] at position i to element A[j] at position j, and A[i,j) denotes a section from which the end j is excluded.

Next, a space-filling curve that is called z-order will be described. A space-filling curve is a curve that passes through all of the points in a d-dimensional space. Using a space-filling curve, it is possible to convert a position in a d-dimensional space to a position in a one-dimensional space. For example, using the z-order, it is possible to convert a point p $(p_1, p_2, \ldots, p_d)$ specified by d coordinates to a one-dimensional value that is called a Z-value.

The following shows the definition of Z-values. When $p_i$ is expressed by a bit having a length l, the Z-value is expressed as a bit sequence having a length d*l in which bits that each indicate the coordinate $p_i$ of the point p with respect to the corresponding dimension are alternatingly included. In other words, the Z-value is a feature value that is specified by the coordinates of points in a multidimensional space. First, the respective highest-order bits of the coordinates $p_1, p_2, \ldots, p_d$ are collected and concatenated. Next, the respective second highest-order bits of the coordinates $p_1, p_2, \ldots, p_d$ are collected and concatenated. After repeating this operation l times, the bit sequences thus obtained are further concatenated in this order. The bit sequence that is ultimately obtained in this way is the Z-value.

Here, a specific example of the Z-value is described with reference to FIG. 1. FIG. 1 is a diagram showing examples of coordinates in a two-dimensional space and Z-values. In FIG. 1, the vertical axis indicates a dimension 1 and the horizontal axis indicates a dimension 2. Each of the bit sequences (binaries) respectively written in the squares indicates the Z-value obtained from the respective coordinates with respect to the dimensions.

Specifically, in the example shown in FIG. 1, each point p in a d (=2) dimensional space is expressed by l=3 bits. In this case, the Z-value corresponding to a point p is expressed by d*l=2*3=6 bits. For example, when $p=(p_1,p_2)=$("000", "111")=(0,7), the Z-value corresponding to this point p is z="010101".

Next, important characteristics that apply to the prefix of the Z-value will be described. In the following description, a prefix obtained from a bit representation that expresses a Z-value is referred to as "a Z-value prefix", and a prefix obtained from bit representations that express the respective coordinates with respect to the dimensions is referred to as "a coordinate prefix".

A Z-value prefix $\pi_z$ can be divided into groups of d coordinate prefixes $\{\pi_k\}(1\leq k\leq d)$ corresponding to each dimension by reversely applying the conversion from the coordinates with respect to the dimensions to Z-values. In other words, regarding a dimension k that satisfies $1\leq k\leq d$, the coordinate prefix $\pi_k$ with respect to the dimension k can be obtained by collecting bits at intervals of d bits, namely the first $k^{th}$ bit, the $(k+d)^{th}$ bit, the $(k+2d)^{th}$ bit, and so on and concatenating the bits. This prefix is referred to as a coordinate prefix corresponding to $\pi_z$ with respect to the dimension k.

Regarding the coordinate prefix $\pi_k$ with respect to the dimension k, the section of the coordinate with respect to the dimension k starting with $\pi_k$ is expressed by $[l_{\pi k}, u_{\pi k}]$. Here, the coverage region $C(\pi_k)$ of $\pi_k$ is defined so as to be limited to the section $[l_{\pi k}, u_{\pi k}]$ only with respect to the dimension k, and so as to be not limited with respect to other dimensions. In other words, $C(\pi_k)=[0,n-1]\times \ldots \times[0,n-1]\times[l_{\pi k},u_{\pi k}]\times[0,n-1]\times \ldots \times[0,n-1]$ is satisfied.

Also, the coverage region $C(\pi_z)$ of the Z-value prefix $\pi_z$ is defined as $C(\pi_z)=C(\pi_1)\cap C(\pi_2)\cap \ldots \cap C(\pi_d)$ $[l_{\pi 1},u_{\pi 1}]\times[l_{\pi 2},u_{\pi 2}]\times \ldots \times[l_{\pi d},u_{\pi d}]$. When a point p is included in $C(\pi_z)$, it is guaranteed that the Z-value of the point p invariably starts with $\pi_z$. This is because the coordinates $p_k$ start with the coordinate prefix $\pi_k$.

For example, it can be assumed that a Z-value prefix $\pi_z=$"011***" having a length of 3 is given. If reverse conversion from a Z-value to the respective coordinates with respect to the dimensions is performed with respect to this prefix, the prefix is divided into a coordinate prefix $\pi_1=$"01*" that has a length of 2 with respect to the dimension 1, and a coordinate prefix $\pi_2=$"1**" that has a length of 1 with respect to the dimension 2.

Here, $[l_{\pi 1},u_{\pi 1}]=$["010", "011"]=[2,3] is satisfied, and $[l_{\pi 2}, u_{\pi 2}]=$["100", "111"]=[4,7] is satisfied, and $C(\pi_z)=[2,3]\times[4,7]$ is satisfied. This relationship is shown in FIG. 1. As can be seen from FIG. 1, a region $C(\pi_1)\cap C(\pi_2)$, which is an overlap between the region $C(\pi_1)$ with respect to the dimension 1 and the region $C(\pi_2)$ with respect to the dimension 2, coincides with $C(\pi_z)$. All of the Z-values included in $C(\pi_z)$ start with $\pi_z$.

Finally, the definition of "an inclusion dimension number", which is required for describing a condition for terminating the spatial division, will be described. When the following inclusion condition is satisfied with respect to a dimension k, it is said that "the coverage region is included in the query region with respect to the dimension k".

Inclusion condition: $l_{qk}\leq l_{\pi k}$ and $u_{\pi k}\leq u_{qk}$.

Furthermore, when the coverage region is included in the query region with respect to h dimensions out of d dimensions, it is said that "the inclusion dimension number of the coverage region is h". If the inclusion dimension number is d, i.e. if the coverage region is included in the query region with respect to all of the dimensions, it is said that the coverage region is completely included in the query region.

EMBODIMENTS

Next, an information processing device, an information processing method, and a program according to embodiments of the present invention will be described with reference to FIGS. 1 to 13.

Device Configuration

First, an overall configuration of an information processing device according to an embodiment of the present invention will be described with reference to FIG. 2. FIG. 2 is a block diagram showing an overall configuration of the information processing device according to the embodiment of the present invention. An information processing device 100 shown in FIG. 2 according to the present embodiment is a device that processes a data structure that expresses a set of points in a multidimensional space. As shown in FIG. 2, the information processing device 100 includes a search unit 10 and an aggregation unit 20.

The search unit 10 out of these units functions when a particular multidimensional region is specified as the query region. In this case, within a multidimensional region that builds up the data structure, the search unit 10 specifies regions that are expressed as portions shared between the regions that start with a feature value prefix and regions that start with the respective coordinate prefixes with respect to the dimensions, and that are included in the query region.

Note that "the feature value prefix" means the same as the above-described Z-value prefix, and is a prefix that is obtained from a bit representation that expresses the feature value (the Z-value) of a point. As described above, "the coordinate prefix" is a prefix that is obtained from a bit representation that expresses a coordinate of a point in terms of a particular dimension.

Next, the search unit 10 outputs selected sections that are sections included in a data structure corresponding to the specified regions. The aggregation unit 20 calculates information regarding a set of points that are included in the query region, by using the selected sections.

As described above, if the information processing device 100 is employed, the input query region is divided based on a region that is shared between a region that is determined by the feature value prefix and a region that is determined by the respective coordinate prefixes with respect to the dimensions, and therefore it is possible to reduce the time complexity required for dividing the query region compared to cases of searching with a k-d tree is searched. Therefore, according to the information processing device 100, it is possible to realize an orthogonal range search with respect to a desired dimension d at a higher speed compared to cases of searching with a k-d tree is searched, by using a data structure having a linear size.

Figure 3:
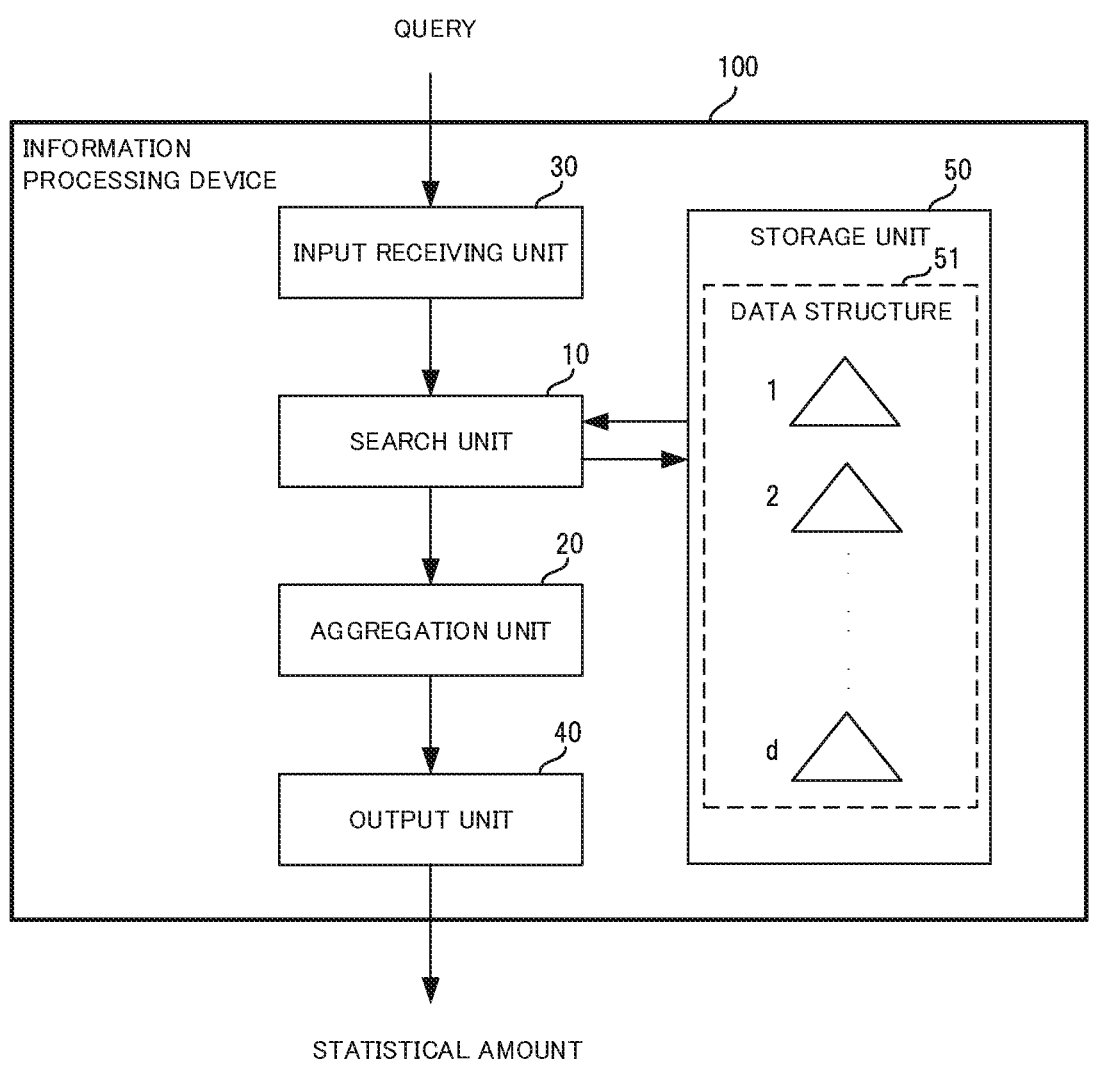
FIG. 3 is a block diagram showing a specific configuration of the information processing device according to the embodiment of the present invention.

Next, the configuration of the information processing device 100 according to the present embodiment will be more specifically described with reference to FIG. 3. FIG. 3 is a block diagram showing a specific configuration of the information processing device according to the embodiment of the present invention.

As shown in FIG. 3, the information processing device 100 according to the present embodiment includes, in addition to the search unit 10 and the aggregation unit 20, an input receiving unit 30, an output unit 40, and a storage unit 50. Among these units, the input receiving unit 30 receives an external input of a query region, and outputs the query region to the search unit 10.

The storage unit 50 stores a data structure 51 that expresses a set of points in a multidimensional space. The data structure 51 according to the present embodiment is built with d wavelet trees whose number of dimensions is d. Each wavelet tree corresponds to one dimension.

The following describes the structure of the d wavelet trees. First, a sequence (feature value sequence) of the Z-values (see FIG. 1) of n points in a multidimensional space are sorted in ascending order, and this sequence is denoted as Z. Furthermore, the points p corresponding to the Z-values are arranged in the same order as ascending order of the Z-values, and thus a sequence P of points p is built. Then, the coordinates of the points that build up the sequence P with respect to a dimension k, are taken out, and the coordinates thus taken out are arranged in the same order as the aforementioned order. The sequence thus obtained is denoted as $P_k$. This sequence $P_k$ is referred to as the coordinate sequence. Note that the sequence Z, the sequence P, and the sequence $P_k$ are each a sequence having a length of n.

Regarding i that satisfies 0≤i<n, a Z-value Z[i] and a coordinate $P_k$[i] correspond to the same point P[i]. Also, within the range 1≤k≤d, a wavelet tree is generated for each dimension k with respect to the coordinate sequence $P_k$. The number of wavelet trees to be generated is d, and a set of d wavelet trees is denoted as $W=\{w_k\}$. The data structure 51 is built up with the set W of d wavelet trees.

Figure 5:
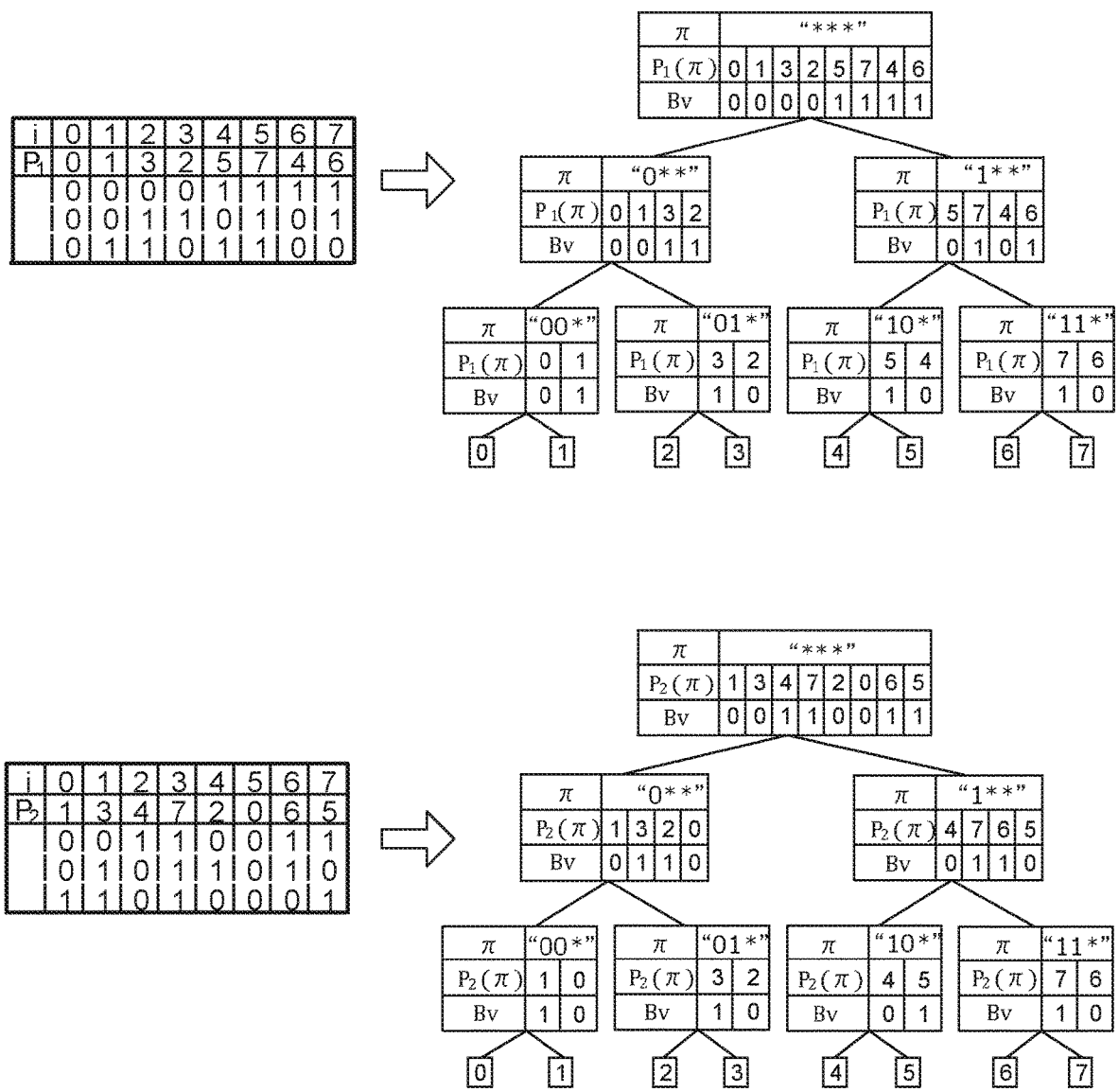
FIG. 5 is a diagram showing examples of wavelet trees used in the embodiment of the present invention, where (a) and (b) of FIG. 5 show wavelet trees each having a different number of dimensions.

Here, specific examples of d wavelet trees will be described with reference to FIGS. 4 and 5 in addition to the above-described FIG. 1. In the following description, it is assumed that the number of dimensions is two. FIG. 4 is a diagram showing examples of Z-value sequences and coordinate sequences used in the embodiment of the present invention. FIG. 5 is a diagram showing examples of wavelet trees used in the embodiment of the present invention, where (a) and (b) of FIG. 5 show wavelet trees each having a different number of dimensions.

First, as shown in FIG. 1, it is assumed that eight circles in the squares express points p in the two-dimensional space. In these examples, n=8 is satisfied, and each point is expressed as a point on [0,7]×[0,7]=64 grids. For example, the Z-value of a point expressed by (5,2)=("101", "010") is "100110"=38. In this regard, the number written in the circle is the order when the corresponding Z-values are arranged in ascending order.

FIG. 4 shows three tables, and the upper table out of these tables shows the sequence Z composed of the Z-values. Also, in FIG. 4, the sequence Z composed of the Z-values corresponds to the eight points shown in FIG. 1. The middle table and the lower table show coordinate sequences $P_i$ that correspond to the sequence Z composed of the Z-values. In these examples, the number of dimensions is two, and therefore the middle table shows a coordinate sequence $P_1$, and the lower table shows a coordinate sequence $P_2$.

In each table, the first row shows an index i of the sequence, and the second row shows integers corresponding to the indices. The third row and the subsequent rows show bit representations of the integers. For example, the Z-value 38 at the position expressed by (5,2) in FIG. 1 is located at the position of the index 4. Therefore, Z[4]=38, $P_1$[4]=5, and $P_2$[4]=2 are satisfied.

The wavelet tree corresponding to the coordinate sequence $P_i$ with respect to the dimension i is defined as a binary tree as follows. Note that a wavelet tree is a binary tree having a depth of l. In this tree structure, the edge from the parent to the child on the left side corresponds to the bit 0, and the edge from the parent to the child on the right side corresponds to the bit 1.

First, it is assumed that the root node of a wavelet tree is located at a depth of 0, and corresponds to a coordinate prefix having a length of 0 bits. It is also assumed that a node v located at a depth of h in the wavelet tree corresponds to an h-bit coordinate prefix π that can be obtained by concatenating h bits that appear in the path from the root to the node. Nodes located at a depth of l are all leaf nodes. A leaf node corresponds to one integer that is expressed by l bits that can be obtained by concatenating l bits that appear in the path from the root to the node.

Furthermore, the node v that is located at a depth of h in the wavelet tree and corresponds to the coordinate prefix π corresponds to a subsequence $P_i(\pi)$ in the coordinate sequence $P_i$. Note that $P_i(\pi)$ is a subsequence that is taken out of the coordinate sequence $P_i$ such that all of the integers that start with the coordinate prefix π are maintained in the same order as the original order. In the present specification, the original $P_i$ and the subsequence $P_i(\pi)$ that is taken out, with attention being paid to the coordinate prefix in, are separately referred to as "the coordinate sequence" and "the coordinate subsequence", respectively.

It is also assumed that the node v stores a bit sequence Bv that is obtained by taking out only the $(h+1)^{th}$ bits of the elements of $P_i$ (π) and concatenating the bits in the same order. In other words, the bit sequence Bv satisfies Bv[i]=0 if the $(h+1)^{th}$ bit of an integer $P_i(\pi)[i]$ is 0, and satisfies Bv[i]=1 if the $(h+1)^{th}$ bit is 1.

Specifically, as shown in (a) and (b) of FIG. 5, in the present embodiment, a wavelet tree $w_1$ that is built for a coordinate sequence $P_1$ with respect to the dimension 1 and a wavelet tree $w_2$ that is built for a coordinate sequence $P_2$ with respect to the dimension 2 are used. Also, (a) and (b) of FIG. 5 show, for each node, the coordinate prefix $\pi$, the coordinate subsequence $P_i(\pi)$, and the bit sequence Bv corresponding to the node.

Also, as shown in (a) of FIG. 5, the wavelet tree $w_1$ is a wavelet tree for the coordinate sequence $P_1=(0,1,3,2,5,7,4,6)$. Each element of the coordinate sequence $P_1$ is expressed as three bits. The root node of each wavelet tree is linked with the coordinate prefix $\pi$="***". Therefore, this coordinate prefix corresponds to all of the values that can be expressed by three bits, i.e. all the values that fall within the range of ["000,"111" ]=[0,7]. For this reason, the root node stores $0+1=1^{st}$ bits of the coordinate subsequence $P_1(\pi)$ as the bit sequence Bv.

Next, the child node on the left side of the root node corresponds to the prefix "0**", and corresponds to integers composed of three bits whose first bit is 0, i.e. corresponds to the range [0,3], and also corresponds to the coordinate subsequence $P_1(\pi)=(0,1,3,2)$, which is obtained by taking out only the values that fall within the range [0,3] from the coordinate sequence $P_1$. Therefore, this left child node stores the second bit as the bit sequence Bv. Note that the same applies to the subsequent child nodes.

The wavelet tree retains a succinct dictionary of the bit sequence Bv with respect to each inner node v. The succinct dictionary is a data structure that supports three kinds of operations, namely access, rank, and select, that are to be performed on a bit sequence B having a length of n. These three kinds of operations can be defined as follows:

access(B,i) returns element B[i] at position i on B; rank1 (B,i) returns the number of 1s that exist in the range of B[0,i); rank0(B,i) returns the number of 0s that exist in the range of B[0,i); select1(B,i) returns position j at which the $(i+1)^{th}$ 1 appears on B; and select0(B,i) returns position j at which the $(i+1)^{th}$ 0 appears on B.

Note that the succinct dictionary may also be referred to as a succinct bit vector or a rank/select dictionary, depending on documents.

In the examples shown in (a) and (b) of FIG. 5, for the sake of explanation, with respect to each node in the wavelet tree, the coordinate prefix in, the coordinate subsequence $P_i(\pi)$, and the bit sequence Bv are shown. However, in reality, the wavelet tree retains only the succinct dictionary for Bv, and does not need to retain the coordinate prefix $\pi$ or the coordinate subsequence $P_i(\pi)$. This is because it is possible to calculate the coordinate prefix $\pi$ from information regarding edges that have been followed, and it is possible to calculate each element of the coordinate subsequence $P_i(\pi)$ by using the succinct dictionary for the bit sequence Bv. Therefore, in reality, the storage unit 50 retains only the succinct dictionary as a data structure.

In other words, according to the present embodiment, the data structure is built such that the data structure includes a bit representation of subsequence $Pi(\pi)$ for each dimension, and such that it is possible to specify a section that is included in the subsequence and in which the bit representation of the feature value of a point corresponding to a coordinate included in the section starts with a feature value prefix.

Note that the wavelet tree is defined various manner in different documents. In the above-described Non-Patent Document 1, the wavelet tree is defined without using a prefix. However, in the present specification, the wavelet tree is defined by using a prefix for the sake of explanation. Note that the essential structure of the wavelet tree is the same for both definitions, and the same operations can be realized.

Also, the wavelet tree only needs to have a structure that allows for a tree structure search, i.e. a structure having a plurality of nodes, and does not need to be explicitly configured as a tree structure. For example, there is a known method called a wavelet matrix, by which a wavelet tree is implemented without classifying bit sequences for each node. The discussion carried out regarding the present invention applies to cases in which the wavelet matrix is employed, in exactly the same manner.

Also, according to the present embodiment, upon receiving a query region output from the input receiving unit 30, the search unit 10 sends an inquiry to the storage unit 50 and acquires the data structure 51. Next, the search unit 10 references the data structure 51, and outputs, as a selected section, a section that is included in the coordinate subsequence and in which the bit representation of the feature value of a point corresponding to a coordinate included in the section starts with a feature value prefix, and the set of points corresponding to the coordinates included in the section is entirely included in the query region.

Also, upon the aggregation unit 20 calculating information (a statistical amount) regarding the set of points included in the query region by using the selected section, this information is output to the output unit 40. Thereafter, the output unit 40 outputs the statistical amount that has been output by the aggregation unit 20, to an external terminal device, a server device, and so on.

Outline of Search Algorithm

Next, before the operation of the information processing device 100 is described, the outline of the search algorithm used by the information processing device 100 will be described below.

First, the regions shared between the coverage region $C(\pi_z)$ of the Z-value prefix and the coverage region $C(\pi_r)$ of the coordinate prefix $\pi_r$ of dimension r ($1 \leq r \leq d$), namely $C(\pi_z) \cap C(\pi_r)$ are considered. The points included in the shared regions are points whose Z-value starts with the Z-value prefix $\pi_z$, and the coordinates with respect to the dimension r starts with coordinate prefix $\pi_r$. Note that the regions shared between the coverage regions is denoted as $C(\pi_z \wedge \pi_r) = C(\pi_z) \cap C(\pi_r)$.

Here, the set of points included in $C(\pi_z \wedge \pi_r)$ invariably correspond to a continuous section $P_r(\pi_r)[s_r, e_r]$ in the coordinate subsequence $P_r(\pi_r)$ of the nodes corresponding to $\pi_r$ in the wavelet tree $w_r$ with respect to the dimension r. This is because the coordinate sequence $P_r$ has been sorted in ascending order of the Z-values, and the coordinates that correspond to the point that starts with $\pi_z$ in the coordinate sequence $P_r$ are invariably obtained as a continuous section. Also, $P_r(\pi_r)$ is a subsequence obtained by taking out only the coordinates that start with $\pi_r$ from $P_r$, in the same order as the order of the Z-values, and therefore the set of points included in $C(\pi_z \wedge \pi_r)$ invariably form a continuous section.

In the present embodiment, such characteristics are used to perform a search. First, the search unit 10 calculates a section in the coordinate subsequence of the node of the wavelet tree corresponding to $C(\pi_z)$, using the Z-value prefix $\pi_z$ as a condition. Next, the search unit 10 calculates a section in the coordinate subsequence of the node of the wavelet tree corresponding to the $C(\pi_z \wedge \pi_r)$, by adding the coordinate prefix $\pi_r$ regarding the dimension r to the condition.

As a result, the set of points included in the query region is represented as a disjoint union of the sets of points included in the sections corresponding to one or more $C(\pi_z \wedge \pi_r)$. If such sections are obtained, it is possible to obtain the statistical amount of the points included in the query region by summing the statistical amounts of the sections.

Also, in the present embodiment, in order to express information that is required for a search result, the following two kinds of nodes, namely a node V and a node Y, are defined as tuples that contain various kinds of information.

$$V=(\pi_z, <v_1,[s_1,e_1]>, <v_2,[s_2,e_2]>, <v_3,[s_3,e_3]>, \ldots, <v_d,[s_d,e_d]>)$$

$$Y=(\pi_r, <v_r,[s_r,e_r]>)$$

The node V is a search node used to search for a section corresponding to $C(\pi_z)$. In the following, the node V is referred to as "the Z-value search node" V. Regarding each of the dimensions k that fall within the range $1 \leq k \leq d$, when the coordinate prefix corresponding to $\pi_z$ with respect to the dimension k is denoted as $\pi_k$, the node V retains a pair of: a node $v_k$ that corresponds to $\pi_k$ on the wavelet tree $w_k$; and a section $[s_k,e_k]$ in the coordinate subsequence $P_k(\pi_k)$. Here, it is assumed that $P_k(\pi_k)[s_k,e_k]$ is a section corresponding to points included in $C(\pi_z)$.

The node Y is a node that retains a section that corresponds to $C(\pi_z \wedge \pi_r)$ with attention being paid to a particular dimension r. In the following description, the node Y is referred to as "the selected section node". This node Y retains a node $v_r$ that corresponds to $\pi_r$ in the wavelet tree $w_r$ with respect to the dimension r, and a section $P_r(\pi_r)[s_r,e_r]$ that corresponds to $C(\pi_z \wedge \pi_r)$ in a coordinate subsequence $P_r(\pi_r)$.

In the search according to the present embodiment, a section that corresponds to $C(\pi_z)$ is first searched by using the Z-value search node V. Then, if $C(\pi_z)$ satisfies a particular condition, the prefix $\pi_r$ with respect to the dimension r is added to the condition, and then a section that corresponds to $C(\pi_z \wedge \pi_r)$ is searched for. Thereafter, the selected section node Y that retains a section that corresponds to points included in the query region is obtained as a search result.

Device Operation

Figure 6:
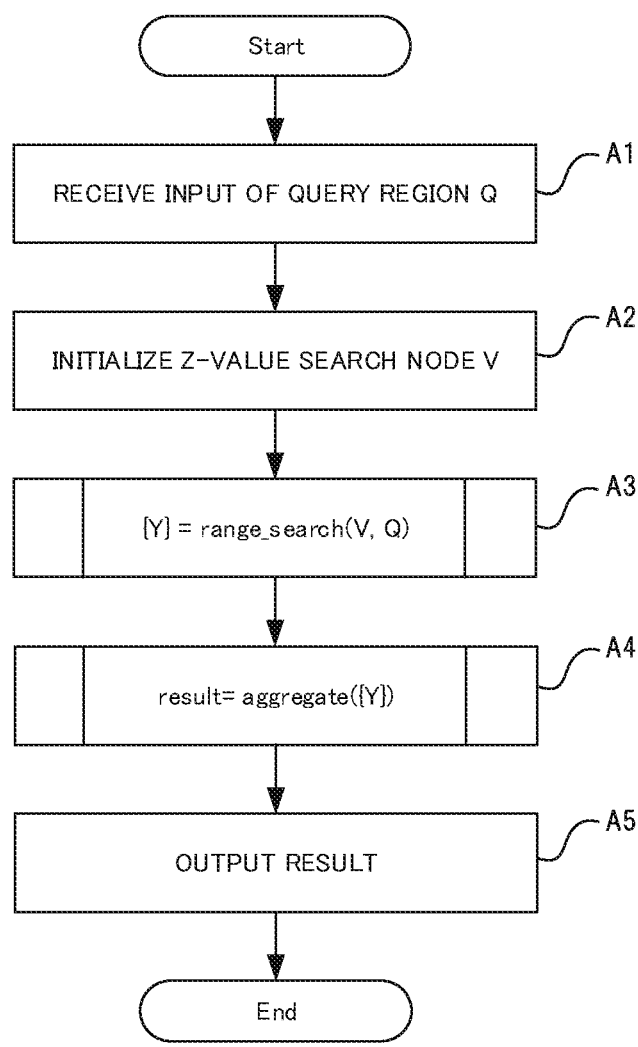
FIG. 6 is a flowchart showing an operation of the information processing device according to the embodiment of the present invention.

Next, the operation of the information processing device 100 according to the embodiment of the present invention will be described with reference to FIG. 6. FIG. 6 is a flowchart showing the operation of the information processing device according to the embodiment of the present invention. In the following description, FIGS. 1 to 4 are referred to where appropriate. In the present embodiment, information processing method is performed by operating the information processing device 100. Therefore, a description of the information processing method according to the present embodiment may be replaced by the following description of the operation of the information processing device 100.

As shown in FIG. 6, first, the input receiving unit 30 externally receives an input for specifying the range of the query region (step A1), and outputs the received content to the search unit 10. This input query region Q is denoted as $Q=[l_{q1}, u_{q1}] \times [l_{q2}, u_{q2}] \times \ldots \times [l_{qd}, u_{qd}]$.

Next, the search unit 10 initializes the Z-value search node V defined as described above, by substituting an initial value thereinto (step A2). Specifically, in step A2, the Z-value search node V is initialized so as to correspond to Z-value prefix $\pi_z$ having a length of 0. The coordinate prefix $\pi_k$ corresponding to the Z-value prefix $\pi_z$ having a length of 0 with respect to each dimension k also has a length of 0, and corresponds to the root node of the wavelet tree. In other words, due to the initialization, the corresponding node $v_k$ with respect to each dimension k serves as the root node of the wavelet tree $w_k$, and is set so as to satisfy $[s_k,e_k]=[0,n-1]$.

Next, the search unit 10 sends an inquiry to the storage unit 50, and acquires the data structure 51. Then, the search unit 10 executes a function "range_search(V,Q)" on the data structure 51 with respect to the query region Q, and acquires a set of one or more selected section nodes {Y} as a return value (step A3). Also, the search unit 10 outputs the set of selected section nodes {Y} thus acquired, to the aggregation unit 20. Each selected section node Y included in {Y} thus acquired retains a section of the coordinate subsequence, and a set of points corresponding to this section are disjoint. The disjoint union of the set of points corresponding to this section is equal to that of the set of points included in the query region.

Next, upon receiving the set of one or more selected section nodes {Y} from the search unit 10, the aggregation unit 20 calls a function "aggregate({Y})", and acquires a statistical amount "result" of the points included in the query region Q as a return value (step A4). Also, the aggregation unit 20 outputs the statistical amount thus acquired to the output unit 40. The function "aggregate({Y})" calculates, for each selected section node Y included in {Y}, a statistical amount regarding the set of points corresponding to the section retained by Y, and thereafter calculates the sum of the statistical amounts to acquire the statistical amount of the points included in the query region.

Finally, the output unit 40 outputs the statistical amount received from the aggregation unit 20 to the outside (step A5). The search processing with respect to the query region Q is complete upon the execution of steps A1 to A5. Steps A1 to A5 are executed every time the query region Q is input.

Step A3

Figure 7:
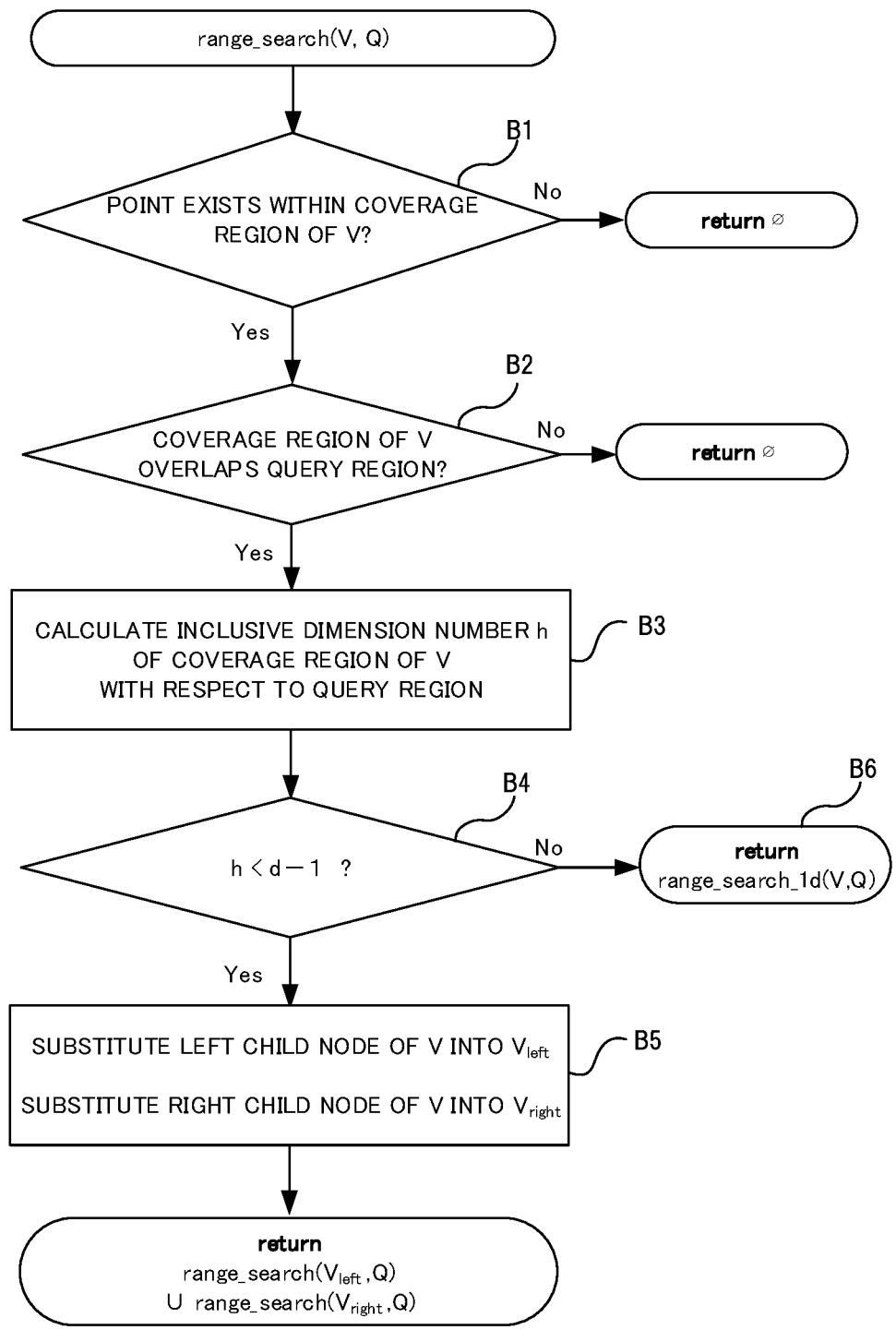
FIG. 7 is a flowchart showing an operation of a function "range_search(V,Q)" for recursively performing an orthogonal range search.

Next, step A3 shown in FIG. 6 will be more specifically described with reference to FIGS. 7 to 10. FIG. 7 is a flowchart showing an operation of a function "range_search (V,Q)" for recursively performing an orthogonal range search. This function is realized by the search unit 10 sending an inquiry to the storage unit 50.

Step A3: Outline

Before the algorithm shown in FIG. 7 is described in detail, the outline of the algorithm shown in FIG. 7 and the concept on which the algorithm is based will be described.

The function "range_search(V,Q)" is a function that is called with a Z-value prefix $\pi_z$ having a length of 0 serving as an argument, and that is able to recursively call itself. Every time the function "range_search(V,Q)" recursively calls itself, the function "range_search(V,Q)" expands the Z-value prefix $\pi_z$ by one bit, and generates a corresponding Z-value search node V for each $\pi_z$ that has been expanded. Expanding $\pi_z$ by one bit is equivalent to dividing the coverage region $C(\pi_z)$ in two, and therefore the coverage region becomes smaller as $\pi_z$ becomes longer.

When the coverage region $C(\pi_z)$ satisfies a given condition, the function "range_search(V,Q)" leaves the recursive loop, and adds $\pi_r$, and thus enters the phase to divide the space by using the coverage region $C(\pi_z \wedge \pi_r)$. Upon the coverage region $C(\pi_z \wedge \pi_r)$ being completely included in the query region Q, the function "range_search(V,Q)" returns the selected section node Y that retains a section of the coordinate subsequence of a node of the wavelet tree, which is equivalent to the coverage region.

Here, the Z-value search node $V=(\pi_z, <v_1,[s_1,e_1]>, <v_2,[s_2,e_2]>, <v_3,[s_3,e_3]>, \ldots, <v_d,[s_d,e_d]>)$, which is required for this search processing, will be more specifically described. Here, it is assumed that the Z-value prefix $\pi_z$ is given, and a continuous section included in Z and starting with $\pi_z$ is denoted as $Z[s_z,e_z]$. If the number of Z[i] starting with $\pi_z$ is expressed as $n_z$, $n_z=e_z-s_z+1$ is satisfied. This $n_z$ is equal to the number of points included in the coverage region $C(\pi_z)$.

As described above, with respect to each of the dimensions 1 to d, there are d coordinate prefixes $\pi_1, \pi_2, \ldots, \pi_d$ that correspond to $\pi_z$. In this case, if $\pi_z>0$ is satisfied, the wavelet trees $w_1$ to $w_d$ invariably have the nodes $v_1, v_2, \ldots,$ and $v_d$ that correspond to the coordinate prefixes. Furthermore, there are coordinate subsequences $P_1(\pi_1), \ldots, P_d(\pi_d)$ that respectively correspond to the nodes.

Here, if the Z-value starts with the Z-value prefix $\pi_z$ in the section $Z[s_z,e_z]$, it means that every $P_k[s_z,e_z]$ with respect to k that satisfies $1 \leq k \leq d$ starts with the coordinate prefix $\pi_k$. Therefore, it can be seen that $n_z$ consecutive integers included in the section $P_k[s_z,e_z]$ are also included in $P_k(\pi_k)$ as $n_z$ consecutive integers in exactly the same order. This section is denoted as $P_k(\pi_k)[s_k,e_k]$. Here $n_z=e_z-s_z+1=e_k-s_k+1$ is satisfied, and $P_k(\pi_k)[s_k+i]=P_k[s_z+i]$ is satisfied with every i that satisfies $0 \leq i < n_z$.

The coordinates included in the section $P_k(\pi_k)$ $[s_k,e_k]$ are coordinates whose Z-values start with $\pi_z$, and these points are included in the coverage region $C(\pi_z)$. Therefore, $l_{\pi k} \leq P_k(\pi_k)$ $[s_k+i] \leq u_{\pi k}$ is satisfied with respect to every i that satisfies $0 \leq i < n_z$. The Z-value search node V retains the Z-value prefix $\pi_z$, the node $v_k$, and the section $[s_k,e_k]$ that have the above-described characteristics.

Specific examples will be described with reference to FIGS. 1, 4, and 5. It is assumed that a Z-value prefix $\pi_z$="011***" having a length of 3 is given. If this Z-value prefix is divided into factors, it can be seen that a coordinate prefix $\pi_1$="01*" having a length of 2 with respect to the dimension 1 and a coordinate prefix $\pi_2$="1**" having a length of 1 with respect to the dimension 2 correspond to the Z-value prefix $\pi_z$. In this case, the section in Z starting with $\pi_z$ is $Z[s_z,e_z]=Z[2,3]$. $n_z=2$ is satisfied.

Here, attention is paid to the dimension 1. $P_1[s_z,e_z]=\{3,2\}=\{"011","010"\}$ is satisfied, and these values start with the coordinate prefix $\pi_1$. Therefore, these values are included in the integer subsequence $P_1(\pi_1)$ corresponding to the node $v_1$ that satisfies $\pi=\pi_1$ on the wavelet tree $w_1$, in the same order. This section is $P_1(\pi_1)[s_1,e_1]=P_1(\pi_1)[0,1]$.

Similarly, attention is paid to the dimension 2. $P_2[s_z,e_z]=\{4,7\}=\{"100","111"\}$ is satisfied, and these values start with the coordinate prefix $\pi_2$. Therefore, these values are included in the integer subsequence $P_2(\pi_2)$ corresponding to the node $v_2$ that satisfies $\pi=\pi_2$ on the wavelet tree $w_2$, in the same order. This section is $P_2(\pi_2)[s_2,e_2]=P_2(\pi_2)[0,1]$.

Therefore, the Z-value search node V corresponding to the above-described Z-value prefix $\pi_z$ retains the following elements.

$V=(\pi_z,<v_1,[s_1,e_1]>,<v_2,[s_2,e_2]>)=("011***",<v_1,[0,1]>,<v_2,[0,1]>)$

Furthermore, a parent-child relationship between Z-value search nodes is defined here. When there is a Z-value search node V that corresponds to Z-value prefix $\pi_z$, a Z-value search node that corresponds to $\pi_z$+"0" is defined as a left child of V, and a Z-value search node that corresponds to $\pi_z$+"1" is defined as a right child of V. For example, if V corresponds to Z-value prefix "111*", the left child of V is a Z-value search node that corresponds to Z-value prefix "1110", and the right child of V is a Z-value search node that corresponds to Z-value prefix "1111**".

Note that in the following description, the coverage region of $\pi_z$ included in the Z-value search node V is referred to as the coverage region of the Z-value search node V. Also, in the following description, an element included in the Z-value search node V is expressed in a concatenated form using "." in some cases. For example, Z-value prefix $\pi_z$ included in Z-value search node V is denoted as $V.\pi_z$.

Step A3: Specific Example

Next, based on the outline of the above-described search algorithm, the details of the algorithm shown in FIG. 7 will be described.

As shown in FIG. 7, the search unit 10 first determines whether or not a point exists within the coverage region of the Z-value search node V (step B1). If the result of determination in step B1 is "Yes", the search unit 10 proceeds to step B2, and if the result is "No", the search unit 10 returns an empty set.

In step B1, whether or not the number of points $n_z=e_k-s_k+1$ included in the coverage region of the Z-value search node V with respect to a given dimension k is greater than 0 is examined, and thus determination is performed. In step B1, if $n_z>0$ is satisfied, the result is Yes, and if $n_z \leq 0$ is satisfied, the result is No. This determination is necessary to terminate a search when a point that starts with $\pi_z$ does not exist.

Next, the search unit 10 determines whether or not the coverage region of the Z-value search node V overlaps the query region (step B2). If the result of determination in step B2 is "Yes", the search unit 10 proceeds to step B3, and if the result is "No", the search unit 10 returns an empty set.

Specifically, in step B2, the search unit 10 obtains the coverage region $C(\pi_z)=[l_{\pi 1},u_{\pi 1}] \times [l_{\pi 2},u_{\pi 2}] \times, \ldots, \times [l_{\pi d},u_{\pi d}]$ of the Z-value search node V by using the value of $\pi_z$. Then, the search unit 10 checks whether or not "$u_{\pi k}<l_{qk}$ or $u_{qk}<l_{\pi k}$" is satisfied with respect to one of the dimensions k when k satisfies $1 \leq k \leq d$. As a result of the checking, if the above-described relationship is true, the search unit 10 determines that the result is "No" because there is no spatial overlap. If the above-described relationship is not true, the search unit 10 determines that the result is "Yes" because there is a spatial overlap. The determination in step B2 is performed in order to perform pruning so that a coverage region that does not overlap the query region is prevented from being further searched.

Next, the search unit 10 compares the coverage region of the Z-value search node V with the query region to calculate an inclusive dimension number h (step B3). The inclusive dimension number h can be calculated by counting the number of dimensions k that satisfy $l_{qk} \leq l_{\pi k}$ and $u_{\pi k} \leq u_{qk}$ according to the definition.

Next, the search unit 10 determines whether or not the inclusive dimension number h is smaller than d−1 (step B4). If the result of determination in step B4 is "Yes", the search unit 10 proceeds to step B5, and if the result is "No", the search unit 10 returns a function "range_search_1d(V,Q)" in step B6. The function "range_search_1d(V,Q)" is a function for dividing the space by using $C(\pi_z \wedge \pi_r)$ with attention being paid to a particular dimension r, and for returning a set of selected section nodes {Y}.

Next, the search unit 10 substitutes the left child node of the Z-value search node V into $V_{left}$, and substitutes the right child node of the Z-value search node V into $V_{right}$ (step B5). Specifically, in step B5, by using information regarding the Z-value search node V, the search unit 10 calculates the left child node of V, namely the search node corresponding to $\pi_z$+"0", and the right child node of V, namely the search node corresponding to $\pi_z$+"1". Note that step B5 will be described later with reference to FIG. 8. Step B5 is executed by executing the algorithm shown in FIG. 8.

Thereafter, in step B5, the search unit 10 calculates the right child node and the left child node of the Z-value search node V, and recursively calls the same function in the following manner.

$$\text{return range\_search}(V_{left},Q) \cup \text{range\_search}(V_{right},Q)$$

By recursively calling the function, the search unit 10 can repeatedly perform the same calculation on the prefix $\pi_z$ whose coverage region has been halved.

Step B5: Outline

Figure 8:
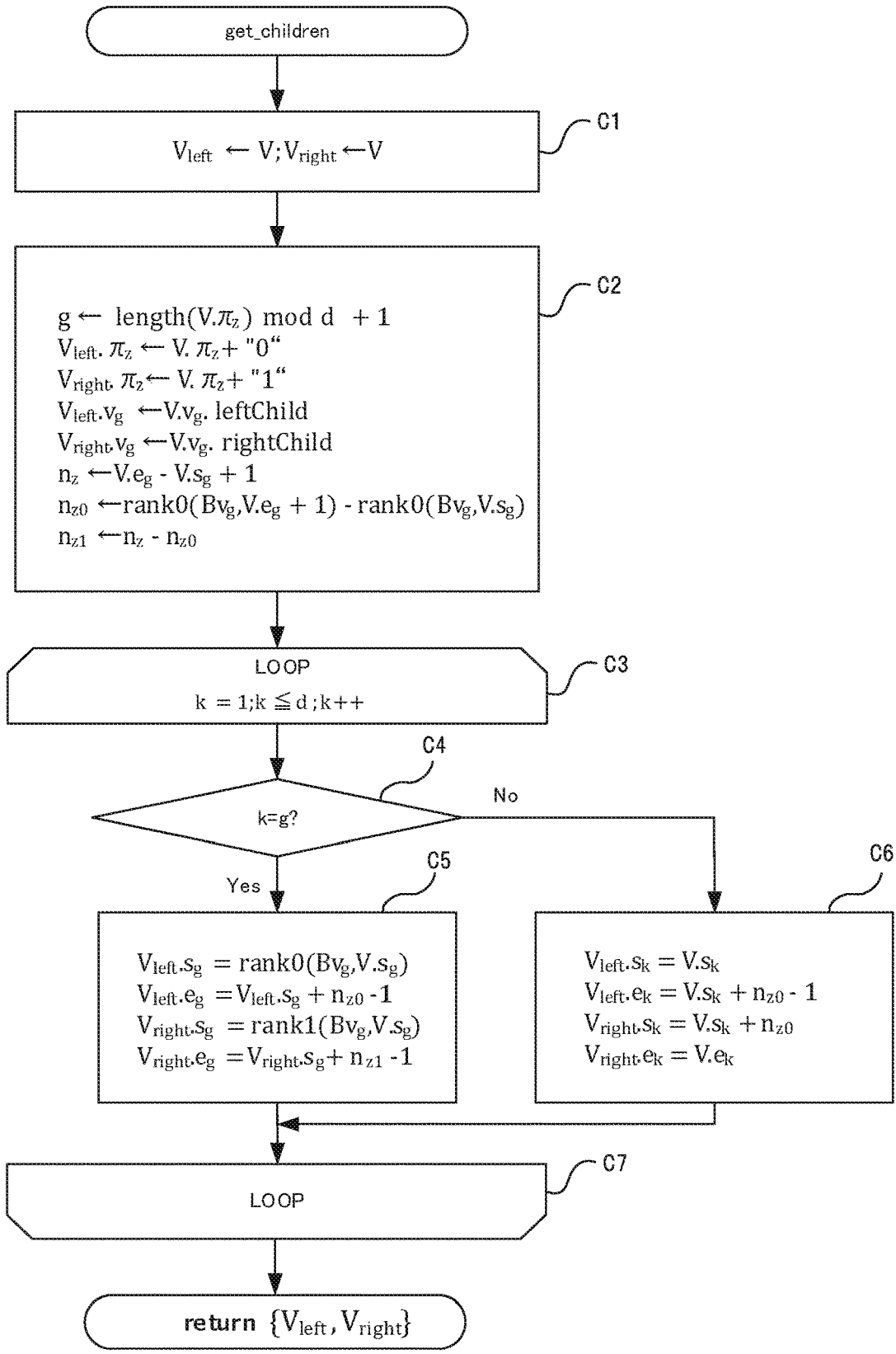
FIG. 8 is a flowchart showing an operation of a function "get_children(V)" for calculating left and right child nodes of a Z-value search node V.

Next, processing performed in step B5 will be specifically described with reference to FIG. 8. FIG. 8 is a flowchart showing an operation of a function "get_children(V)" for calculating the left and right child nodes of the Z-value search node V. The function "get_children(V)" is also realized by the search unit 10 sending an inquiry to the storage unit 50.

First, before the algorithm shown in FIG. 8 is described in detail, how the left and right nodes can be calculated from the Z-value search node V will be described.

First, a new Z-value prefix obtained by adding a bit b to the end of the Z-value prefix $\pi_z$ to which the Z-value search node V corresponds is denoted as $\pi'_z$, and calculating a new Z-value search node V' that corresponds to $\pi'_z$ is conceived. If b is 0, the Z-value search node V' is the left child node of the Z-value search node V, and if b is 1, the Z-value search node V' is the right child node of the Z-value search node V. In the following description, $V'=(\pi'_z, <v'_1,[s'_1,e'_1]>, <v'_2,[s'_2,e'_2]>, <v'_3,[s'_3,e'_3]>, \ldots, <v'_d,[s'_d,e'_d]>)$ is satisfied.

If a dimension $g=\text{length}(\pi_z) \mod d+1$ is satisfied, the following expressions are true with respect to the dimension g. Note that length( ) in the above description represents the length of the prefix.

$$\pi'_k = \pi_k + b \text{ (in the case where } k=g\text{)}$$

$$\pi'_k = \pi_k \text{ (in other cases)}$$

In other words, when the Z-value search node V' corresponding to $\pi'_z$ is calculated from the Z-value search node V corresponding to the $\pi_z$, the coordinate prefix $\pi'_k$ corresponding to $\pi'_z$ with respect to the dimension k ($\neq$g) is equal to the coordinate prefix $\pi k$ corresponding to $\pi_z$. However, the coordinate prefix $\pi'_g$ corresponding to $\pi'_z$ with respect to the dimension g is the coordinate prefix $\pi_g$ that corresponds to $\pi_z$ and to which the bit b has been added. Since $\pi'_g = \pi_g + b$ is satisfied, a node $v'_g$ that corresponds to $\pi'_g$ on the wavelet tree $w_g$ is a child node of the node $v_g$ that corresponds to $\pi_g$.

Specifically, as shown in FIGS. 1, 4, and 5, the coordinate prefixes $\pi_1$="01*" and $\pi_2$="1" correspond to the Z-value prefix $\pi_z$="011*". In this case, if b=1 is satisfied, i.e. if it is assumed that $\pi'_z=\pi_z+$"1"="0111", $\pi'_z$="0111" corresponds to $\pi'_1$="01*" and $\pi'_2$="11". Also g=length($\pi_z$) mod d+1=3 mod 2+1=2 is satisfied.

From the above result, it can be seen that $\pi'_1=\pi_1$ and $\pi'_2=112+b$ are stratified, and that the bit b is actually added with respect to the dimension g=2. Since b=1 is satisfied, the node $v'_g$ corresponding to $\pi'_g$ is the right child node of the node $v_g$ corresponding to $\pi_g$.

Here, attention is paid to the wavelet tree $w_g$ with respect to the dimension g, which is the only dimension for which the coordinate prefix changes. Since a section $P_g(\pi_g)[s_g,e_g]$ that corresponds to $\pi_z$ is already known, calculating a section $P_g(\pi'_g)[s'_g,e'_g]$ that corresponds to $\pi'_z=\pi_z+b$, based on this section, is conceived.

Attention is paid to a bit sequence $Bv_g$ that is retained by a node $v_g$ that corresponds to $\pi_g$ on the wavelet tree $w_g$. A bit sequence $Bv_g[s_g,e_g]$ is obtained by taking out the (length($\pi_g$)+1)$^{th}$ bits of $P_g(\pi_g)[s_g,e_g]$ and concatenating the bits. The coordinates in the $P_g(\pi_g)[s_g,e_g]$ correspond to the same points in the same order as the Z-values in the $Z[s_z,e_z]$. Therefore, the bit sequence $Bv_g[s_g,e_g]$ is equal to the sequence obtained by taking out the (length($\pi_z$)+1)$^{th}$ bits of $Z[s_z,e_z]$ and concatenating the bits. The Z-values have been sorted in ascending order, and every $Z[s_z,e_z]$ starts with $\pi_z$. Therefore, it is guaranteed that the bit sequence $Bv_g[s_g,e_g]$, obtained by taking out the (length($\pi_z$)+1)$^{th}$ bits and concatenating the bits, such as "000 . . . 000111 . . . 111", can be divided into the first half in which only 0s are consecutively arranged and the second half in which only 1s are consecutively arranged.

The number of 0s and the number of 1s that appear in the bit sequence $Bv_g[s_g,e_g]$ are respectively denoted as $n_{z0}$ and $n_{z1}$. Also, $n_z=n_{z0}+n_{z1}$ is satisfied. As considered above, all of the bits in the bit sequence $Bv_g[s_g,s_g+n_{z0}-1]$ are 0. All of the bits in the $Bv_g[s_g+n_{z0}, e_g]$ are 1. This means that the section $Z[s_z,s_z+n_{z0}-1]$ starts with $\pi_z+$"0" and the section $Z[s_z+n_{z0},e_z]$ starts with $\pi_z+$"1". Therefore, if $\pi'_z=\pi_z+$"0" is satisfied, $[s'_z,e'_z]$ can be calculated as $[s'_z,e'_z]=[s_z,s_z+n_{z0}-1]$, and if $\pi'_z=\pi_z+$"1" is satisfied, $[s'_z,e'_z]$ can be calculated as $[s'_z,e'_z]=[s_z+n_{z0},e_z]$. $n_{z0}$ can be calculated as $n_{z0}=\text{rank0}(Bv_g,e_g+1)-\text{rank0}(Bv_g,s_g)$, using the succinct dictionary of the bit sequence $Bv_g$. $n_{z1}$ can be calculated as $n_{z1}=n_z-n_{z0}$.

If b=0 is satisfied, the node $v'_g$ corresponding to $\pi'_g$ is the left child node of the node $v_g$ corresponding to ng. Furthermore, the section $[s'_g,e'_g]$ corresponding to $\pi'_z$ on $P_g(\pi'_g)$ can be calculated as follows. That is to say, $s'_g=\text{rank0}(Bv_g,s_g)$, and $e'_g=s'_g+n_{z0}-1$ are satisfied. This is because the fact that the bit of $Bv_g[i]$ corresponding to a given i is 0 means that the corresponding integer $P_g(\pi_g)[i]$ starts with $\pi'_g=\pi_g+$"0", and only such integers corresponding to the bit 0 are taken out of the $P_g(\pi_g)$ and are included in $P_g(\pi'_g)$.

Similarly, if b=1 is satisfied, the node $v'_g$ is the right child node of the node $v_g$, and the corresponding section on the node $v'_g$ can also be calculated in the same manner as in the case of b=0. Also, $s'_g=\text{rank1}(Bv_g,s_g)$, and $e'_g=s'_g+n_{z1}-1$ are satisfied. As described above, it is possible to obtain the section $P_g(\pi'_g)[s'_g,e'_g]$ corresponding to $\pi'_z$ in the $P_g(\pi'_g)$ corresponding to the coordinate prefix $\pi'_g$ with respect to the dimension g.

The following examines the cases of other dimensions that satisfy k$\neq$g. With respect to these dimensions k, $\pi'_k=$Ilk is satisfied. Therefore, the range corresponding to $\pi'_z$ is obtained on the same coordinate subsequence $P_k(\pi'_k)=P_k(\pi_k)$. Here, it is already known that the section corresponding to the section $Z[s_z,e_z]$ starting with $\pi_z$ is $[s_k,e_k]$. Therefore, it is possible to obtain the section corresponding to $\pi'_z$ by dividing this section into the first half and the second half, and performing updating to satisfy $[s'_k,e'_k]=[s_k,s_k+n_{z0}-1]$ if $\pi'_z=_z+$"0" is satisfied, and performing updating to satisfy $[s'_k,e'_k]=[s_k+n_{z0},e_k]$ if $\pi'_z=\pi_z+$"1" is satisfied.

Based on the above description, it has been found that when the Z-value search node V corresponding to $\pi_z$ is given, it is also possible to calculate information included in Z-value search node V' corresponding to $\pi'_z$ to which one bit has been added. That is to say, it is possible to calculate the left child node $V_{left}$ corresponding to $\pi_z+$"0", and the right child node $V_{right}$ corresponding to $\pi_z+$"1".

Specifically, it is assumed that $\pi_z$="011***", $\pi_1$="01*", $\pi_2$="1", $Z[s_z,e_z]=Z[2,3]$, $P_1(\pi_1)[s_1,e_1]=P_1(\pi_1)[0,1]$, and $P_2(\pi_2)[s_2,e_2]=P_2(\pi_2)[0,1]$ are known as facts. It is also assumed that b=1 is satisfied. In this case, it is possible to obtain the section corresponding to $\pi'_z=\pi_z+$"1"="0111" in the following manner.

That is, since $\pi'_1=\pi_1=$"01*" and $\pi'_2=\pi_2+$"1"="11*" are satisfied, the only dimension for which the coordinate prefix changes is the dimension g=2. Therefore, attention is paid to the wavelet tree with respect to the dimension g=2, and calculating $P_2(\pi'_2)[s'_2,e'_2]$ from $P_2(\pi_2)[s_2,e_2]$ is conceived.

Since the bit sequence retained by the node $v_2$ is $Bv_2=$"0101", $Bv_2[s_2,e_2]=Bv_2[0,1]=$"01" is satisfied, and $n_{z0}=1$ and $n_{z1}=1$ are satisfied. Since $Bv_2[0,1]$ corresponds to the fourth bit in the section $Z[2,3]$, it can be seen that the fourth bit of $Z[2]$ is 0 and the fourth bit of $Z[3]$ is 1. Therefore, since b=1, $v'_2$ is the right child of $v_2$, and $s'_2=$rank1$(Bv_2,s_2)=0$ and $e'_2=s'_2+n_{z1}-1=0+1-1=0$ are satisfied.

Similarly, with respect to the dimension 1, the region having a length of 2 is divided into regions each having a length 1, and therefore the new sections are calculated in the following manner.

$$[s'_1,e'_1]=[s_1+n_{z0},e_1]=[0+1,1]=[1,1]$$

Based on the description above, it is possible to calculate the following values with respect to $\pi'_z$.

$$\pi'_z=\text{"0111**"}, \pi'_1=\text{"01*"}, \pi'_2=\text{"11*"}, Z[s'_2,e'_2]=Z[3,3],$$
$$P_1(\pi'_1)[s'_1,e'_1]=P_1(\pi'_1)[1,1], P_2(\pi'_2)[s'_2,e'_2]=P_2(\pi'_2)[0,0]$$

Step B5: Specific Example

The above-described examination represented in the form of an algorithm is the algorithm shown in FIG. 8. The algorithm shown in FIG. 8 will be described in detail below. According to the algorithm shown in FIG. 8, processing for calculating the left and right child nodes of the Z-value search node V is executed as follows. $V_{left}$ denotes a tuple that represents the left child node of the Z-value search node V, and $V_{right}$ denotes a tuple that represents the right child node of the Z-value search node V.

First, as shown in FIG. 8, the search unit 10 copies the content of the Z-value search node V to $V_{left}$ and the content of the Z-value search node V to $V_{right}$ as well (step C1). As a result, the nodes $v_k$ of the wavelet tree included in $V_{left}$ and $V_{right}$ are both the same as the node $v_k$ of the wavelet tree included in the Z-value search node V.

Next, the difference from the Z-value search node V is updated with respect to $\pi_k$ and $v_k$ respectively included in $V_{left}$ and $V_{right}$ (step C2). In other words, it is assumed that g=length$(\pi_z)$ mod d+1, and $V_{left}.\pi_z=V.\pi_z+$"0" is substituted into $V_{left}.\pi_z$, and $V_{right}.\pi_z=V.\pi_z+$"1" is substituted into $V_{right}.\pi_z$. Furthermore, the left child node of $V.v_g$ is substituted into $V_{left}.v_g$, and the right child node of $V.v_g$ is substituted into $V_{right}.v_g$. Also, $n_z=e_g-s_g+1$ is satisfied. $n_{z0}$ is derived from the expression $n_{z0}=$rank0$(Bv_g,e_g+1)-$rank0$(Bv_g,s_g)$, using the succinct dictionary of the bit sequence $Bv_g$. $n_{z1}$ is calculated using $n_{z1}=n_z-n_{z0}$.

Next, the search unit 10 enters the loop with respect to the dimension k in order to calculate the section $[s_k,e_k]$ (step C3). Next, the search unit 10 determines whether or not k=g is satisfied during the loop (step C4). Then, the search unit 10 proceeds to step C5 if the result of determination in step C4 is "Yes", and proceeds to step C6 if the result is "No".

If the result of determination in step C4 is "Yes", i.e. if k=g is satisfied, the search unit 10 performs calculation with respect to the dimension g (step C5). In step C5, $V_{left}.s_g=$rank0$(Bv_g,s_g)$ and $V_{left}.e_g=V_{left}.s_g+n_{z0}-1$ are satisfied. Also, $V_{right}.s_g=$rank1$(Bv_g,s_g)$ and $V_{right}.e_g=V_{right}.s_g+n_{z1}-1$ are satisfied.

On the other hand, if the result of determination in step C4 is "No", i.e. if k=g is not satisfied, the search unit 10 performs calculation with respect to k other than the dimension g (step C6). In step C6, $V_{left}.s_k=V.s_k$ and $V_{left}.e_k=V.s_k+n_{z0-1}$ are satisfied. Also, $V_{right}.s_k=V.s_k+n_{z0}$ and $V_{right}.e_k=V.e_k$ are satisfied.

Upon completion of the loop with respect to dimension k (step C7), $V_{left}$ and $V_{right}$ are returned and step B5 is complete. In this way, the algorithm shown in FIG. 8 calculates the left and right nodes of the Z-value search node V.

This concludes the description of the operation according to the algorithm shown in FIG. 7 when the result of step B4 is "Yes". Next, the operation when the result of step B4 is "No" will be described. In other words, the operation of the function "range_search_1d(V,Q)" shown in FIG. 7 will be described.

Step B6: Outline

Next, step B6 shown in FIG. 7 will be described with reference to FIGS. 9 and 10. The function "range_search_1d(V,Q)" is a function to which the Z-value search node V and the query region Q are input, and that returns the selected section node Y that retains a section that corresponds to the coverage region $C(\pi_z \wedge \pi_r)$ that is included in the query region Q.

Figure 9:
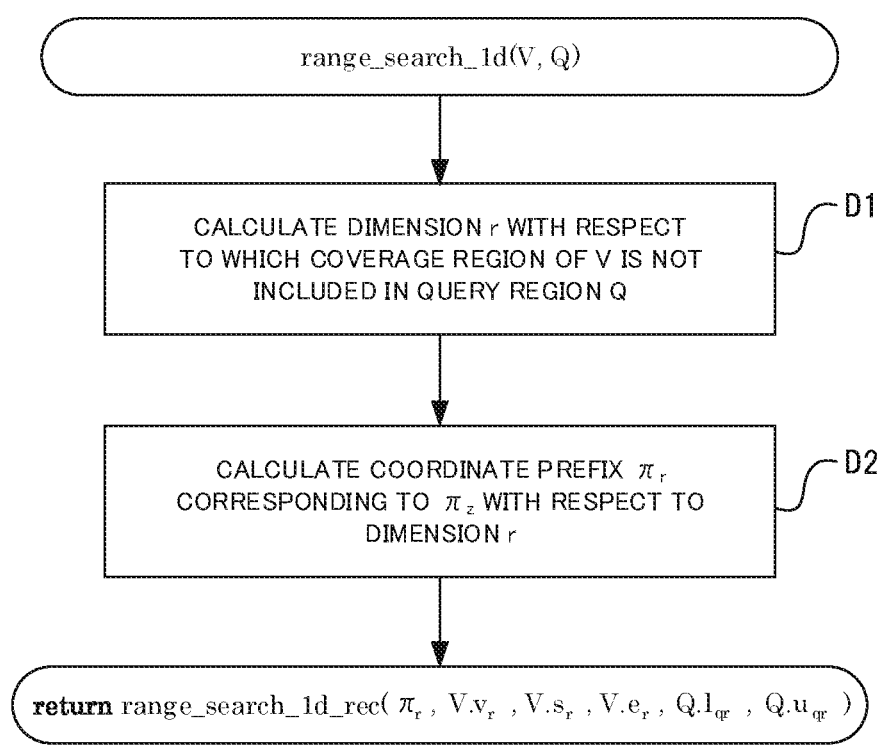
FIG. 9 is a diagram showing an operation of a function "range_search_1d(V,Q)" shown in FIG. 7.
Figure 10:
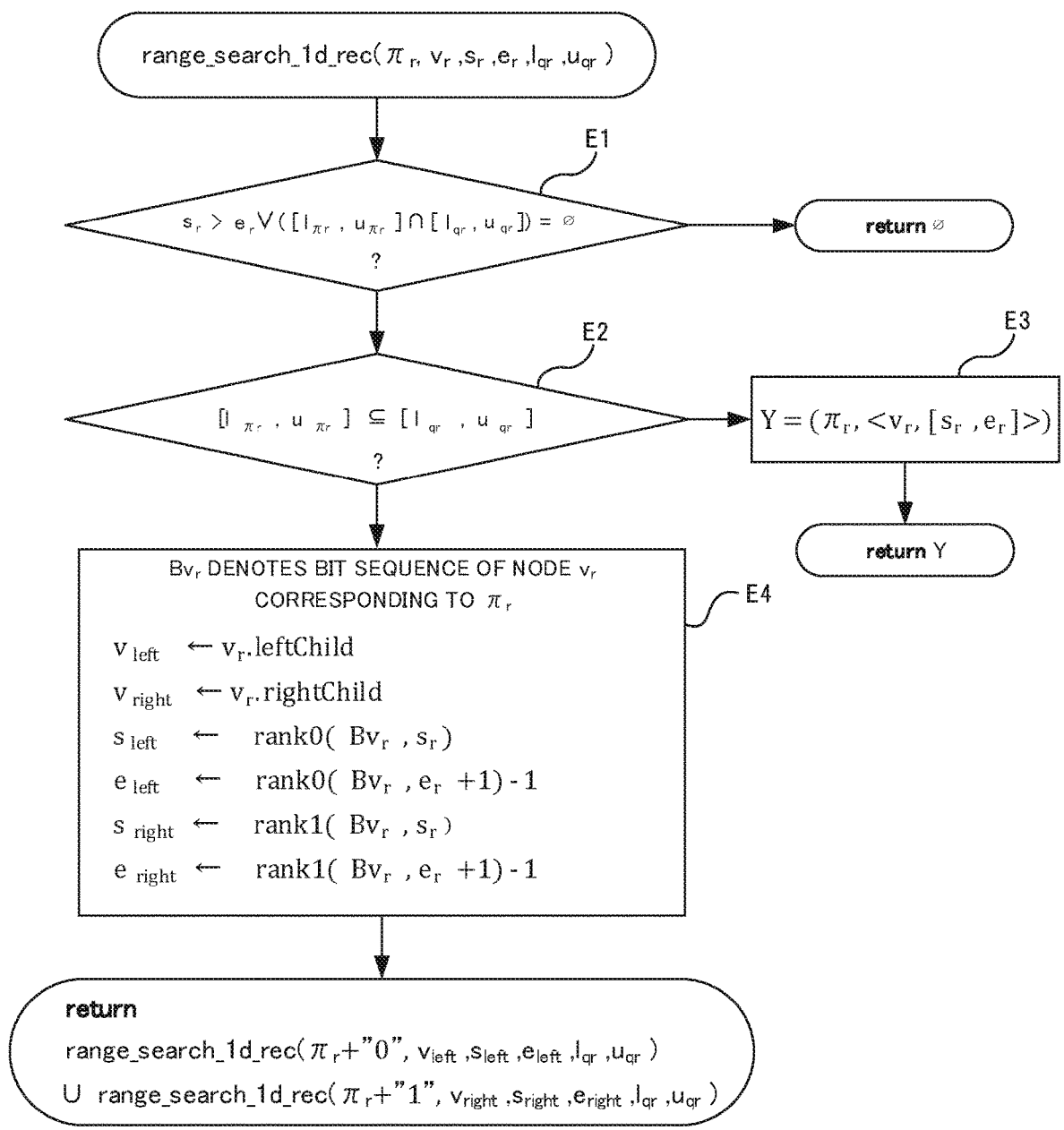
FIG. 10 is a diagram showing an operation of a function "range_search_1d_rec($\pi_r$, $v_r$, $s_r$, $e_r$, $l_{qr}$, $u_{qr}$)" shown in FIG. 9.

Before the algorithm shown in FIGS. 9 and 10 is described in detail, the outline of the operation will be described below.

The case in which the result of step B4 shown in FIG. 7 is "No", i.e. when the inclusive dimension number of the coverage region $C(\pi_z)$ of the prefix $\pi_z$ has reached d−1 will be considered. The fact that the inclusive dimension number has reached d−1 means that the inclusion condition has been satisfied with respect to d−1 dimensions. In this case, the remaining one dimension, which has not been included, is denoted as a dimension r. The coordinate prefix $\pi_r$ corresponding to $\pi_z$ with respect to the dimension r is considered, and attention is paid to the section $P_r(\pi_r)[s_r,e_r]$ corresponding to $\pi_z$. As described above, this section includes the same coordinates as those in $P_r[s_z,e_z]$ in the same order.

All of the points included in $P[s_z,e_z]$ are included in the coverage region of $\pi_z$, and therefore, the inclusion conditions with respect to all of the dimensions other than the dimension r are satisfied, but the inclusion condition with respect to the dimension r is not satisfied. In other words, the condition that the values $p_r$ of the coordinates with respect to the dimension r are included in $[l_{qr}, u_{qr}]$ has not been satisfied yet.

Therefore, according to the algorithm shown in FIGS. 9 and 10, only $\pi_r$ is expanded so as to reduce the coverage region, and thus a coverage region that is included in the query region is formed. In other words, a selected section node that retains a section in the coordinate subsequence corresponding to the resultant coverage region is returned until a coverage region $C(\pi_z \wedge \pi'_r)$ that is included in $[l_{qr}, u_{qr}]$ with respect to the dimension r is obtained, where $\pi'_r$ denotes a coordinate prefix obtained by expanding $\pi_r$.

Step B6: Specific Example

Next, a specific example of step B6 shown in FIG. 7 will be described. FIG. 9 is a diagram showing the operation of the function "range_search_1d(V,Q)" shown in FIG. 7. As shown in FIG. 9, the search unit 10 calls the function "range_search_1d(V,Q)", and calculates the dimension r with respect to which the coverage region of the Z-value search node V is not included in the query region Q (step D1).

Next, the search unit 10 calculates the prefix $\pi_r$ corresponding to $\pi_z$ with respect to the dimension r (step D2).

Then, the search unit 10 calls the recursive function as follows by using the value obtained in step D2, and executes each step shown in FIG. 10.

$$\text{return range\_search\_1}d\_\text{rec}(\pi_r, V.v_r, V.s_r, V.e_r, Q.l_{qr}, Q.u_{qr})$$

Here, before a detailed description is given with reference to FIG. 10, the outline of a function "range_search_1d_rec $(\pi_r, v_r, s_r, e_r, l_{qr}, u_{qr})$" will be described. The function "range_search_1d_rec $(\pi_r, v_r, s_r, e_r, l_{qr}, u_{qr})$" is a recursive function that returns a section $P_r(\pi'_r)$ [s'$_r$, e'$_r$] in the coordinate subsequence $P_r(\pi'_r)$ whose Z-value starts with $\pi_z$ and the values $p_r$ of coordinates with respect to the dimension r are included in [$l_{qr}$, $u_{qr}$]. In other words, this function is a function that returns a section that corresponds to the coverage region $C(\pi_z \wedge \pi'_r)$ that is completely included in the query region Q. Note that $\pi'_r$ denotes a coordinate prefix that is obtained by expanding the prefix $\pi_r$.

The operation performed by the function "range_search_1d_rec $(\pi_r, v_r, s_r, e_r, l_{qr}, u_{qr})$" is realized by calculating s'$_r$ at the left end of the section and e'$_r$ at the right end of the section on each node. First, the section $P_r(\pi_r)$[s$_r$, e$_r$] in the coordinate subsequence of the node $v_r$ corresponding to the prefix $\pi_r$ is considered.

However, it is assumed that this section is a section that corresponds to a point whose Z-value starts with $\pi_z$. In this case, the left child node $v_{left}$ and the right child node $v_{right}$ of the wavelet tree of the search node $v_r$ are considered. It is assumed that $P_r(\pi'_r)$[s'$_r$,e'$_r$] represents a section corresponding to a subsequence composed of integers that start with $\pi'_r$ and taken out from the section $P_r(\pi_r)$[s$_r$,e$_r$], where $\pi'_r$ denotes the prefix corresponding to the child node.

According to the definition of the wavelet tree, at the time of movement to the left child node, the section [s'$_r$,e'$_r$] can be obtained by using expressions s'$_r$=rank0(Bv$_r$,s$_r$) and e'$_r$=rank0(Bv$_r$,e$_r$+1)−1. On the other hand, at the time of movement to the right child node, the section [s'$_r$,e'$_r$] can be obtained by using expressions s'$_r$=rank1(Bv$_r$,s$_r$) and e'$_r$=rank1(Bv$_r$,e$_r$+1)−1.

The above operation is repeatedly executed for each node, and when all of the values of coordinates corresponding to a node and starting with the prefix $\pi'_r$ are included in [$l_{qr}$,$u_{qr}$], the selected section node Y that includes the section $P_r(\pi'_r)$[s'$_r$,e'$_r$] in the node is returned. Only coordinates that fall within the range of [$l_{qr}$,$u_{qr}$] appear in this section, and therefore this section corresponds to points that satisfy the condition of the range with respect to the dimension r. In other words, the selected section node Y corresponds to points that are completely included in the query region. The time complexity of the above operation is equal to the time complexity of two-dimensional "range count" that is already known with respect to wavelet trees, and is O(log n).

Next, the operation of the function "range_search_1d_rec $(\pi_r, v_r, s_r, e_r, l_{qr}, u_{qr})$" will be described in detail with reference to FIG. 10. FIG. 10 is a diagram showing the operation of the function "range_search_1d_rec$(\pi_r, v_r, s_r, e_r, l_{qr}, u_{qr})$" shown in FIG. 9.

As shown in FIG. 10, the search unit 10 executes the function "range_search_1d_rec$(\pi_r, v_r, s_r, e_r, l_{qr}, u_{qr})$", and determines whether or not s$_r$>e$_r$ or ([$l_{\pi r}$, $u_{\pi r}$]∩[$l_{qr}$, $u_{qr}$])=φ is satisfied (step E1). If the result of determination in step E1 is "No", the search unit 10 proceeds to step E2, and if the result is "Yes", the search unit 10 returns an empty set. Note that the [$l_{\pi r}$, $u_{\pi r}$] represents a section of integers that start with $\pi_r$.

Next, the search unit 10 determines whether or not [$l_{\pi r}$, $u_{\pi r}$]⊆[$l_{qr}$, $u_{qr}$] is satisfied (step E2). Note that the [$l_{\pi r}$, $u_{\pi r}$] represents a section of integers that start with $\pi_r$.

If the result of determination in step E2 is "Yes", i.e. if [$l_{\pi r}$, $u_{\pi r}$]⊆[$l_{qr}$, $u_{qr}$] is satisfied, the coverage region is completely included in the query region. Therefore, the search unit 10 substitutes the section [$l_{\pi r}$, $u_{\pi r}$] into the selected section node Y=($\pi_r$, <v$_r$, [s$_r$,e$_r$]>) and returns the selected section node Y (step E3).

On the other hand, if the result of determination in step E2 is "No", the search unit 10 calculates a section [s$_{left}$, e$_{left}$] of the left child node and a section [s$_{right}$, e$_{right}$] of the right child node, using the four expressions regarding "rank" shown in FIG. 10, where B$_{vr}$ denotes the bit sequence of the node v$_r$ corresponding to $\pi_r$ (step E4).

Thereafter, in order to perform the same processing on the right child node and the left child node, the search unit 10 recursively calls the following function.

$$\text{return range\_search\_1}d\_\text{rec}(\pi_r+\text{"0"},v_{left},s_{left},e_{left},l_{qr},u_{qr}) \cup \text{range\_search\_1}d\_\text{rec}(\pi_r+\text{"1"},v_{right},s_{right},e_{right},l_{qr},u_{qr})$$

Step A4

Next, a function "aggregate({Y})" that is called in step A4 shown in FIG. 6 will be described. This function is executed by the aggregation unit 20.

Using the function "aggregate({Y})", the aggregation unit 20 can calculate, with respect to each selected section node Y included in {Y}, a statistical amount regarding the set of points corresponding to the selected section node Y. Thereafter, using the statistical amounts, the aggregation unit 20 can calculate a statistical amount regarding points included in the query region Q.

The function "aggregate({Y})" is an abstraction of various aggregation functions, and it is possible to use the information processing device 100 to perform various kinds of an orthogonal range search by replacing this function with a specific aggregation function.

For example, the information processing device 100 may be used to count the number of points included in the query region Q. Specifically, if the selected section node Y=($\pi_r$, <v$_r$, [s$_r$,e$_r$]>) is included in the input {Y}, the section $P_r(\pi_r)$[s$_r$,e$_r$] in the coordinate subsequence corresponds to the points included in the query region Q. This means that (e$_r$−s$_r$+1) points included in this section are included in the query region Q. In other words, it is possible to calculate the number of points included in the query region by calculating the sum of (e$_r$−s$_r$+1) of all of the obtained selected section nodes Y. If this is the case, the aggregation unit 20 outputs the number of points included in the query region Q as the statistical amount.

Also, if all of the points p are given a weight w(p), the information processing device 100 can calculate the sum of the weights of the points included in the query region. It is possible to realize the above operation in the case where a sequence W$_r$($\pi_r$) obtained by arranging the weights w(p) of the corresponding points p in the same order has been set for each of the coordinates in every coordinate subsequence $P_r(\pi_r)$, if a data structure that allows for calculating the total weights of the sections in the sequence has been prepared.

An example of such a data structure is an existing data structure that handles "Partial Sum". In the case of such a data structure, if it is known that the section $P_r(\pi_r)$[s$_r$,e$_r$] in the coordinate subsequence corresponds to the points included in the query region, it is possible to calculate the sum of the weights of all of the points included in the query region Q by calculating the total weight in each section $W_r(\pi_r)[s_r,e_r]$ in the sequence of weights corresponding to the section $[s_r,e_r]$, and sum the total weights. If this is the case, the aggregation unit 20 outputs the total of the weights of all of the points included in the query region Q as the statistical amount.

Similarly, the information processing device 100 may be used as a report query that returns a list of every point included in the query region Q. In other words, with respect to the section $P_r(\pi_r)[s_r,e_r]$ in a coordinate subsequence, it is possible to specify the positions i, in the original integer sequence $P_r$, of the elements $P_r(\pi_r)[j]$ included in this section by tracing back the wavelet tree. In this case, the points P[i] are included in the query region. If this is the case, the aggregation unit 20 outputs a list of every point included in the query region Q as the statistical amount.

As described above, according to the present embodiment, it is possible to realize various kinds of an orthogonal range search. Also, the present embodiment is not limited to a mode in which the algorithms shown in FIGS. 6 to 10 are individually used, and may be a mode in which other search algorithms are combined with the algorithms shown in FIGS. 6 to 10 as appropriate.

For example, in the present embodiment, simple scanning processing may be combined with the algorithms shown in FIGS. 6 to 10. According to the algorithms shown in FIGS. 6 to 10, a search is executed by dividing the range $Z[s_z,e_z]$ in the sequence Z composed of the Z-values, using the Z-value search node V. However, if the range $Z[s_z,e_z]$ becomes narrow, it is possible to achieve a higher speed by scanning the range $P_k[s_z,e_z]$ corresponding to the coordinate sequence $P_k$ and checking whether or not the condition is satisfied with respect to each value $P_k[i]$ compared to simply tracing the wavelet tree structure. For this reason, scanning processing is combined as described above. If this is the case, although it is required that the coordinate sequence $P_k$ is retained, the total data structure has a linear size as well.

Effects of Embodiment

The present embodiment has an effect in that time complexity is lower than k-d trees. To show this fact, the worst time complexity will be analyzed. A usual k-d tree is an approach by which division is performed until the inclusive dimension number reaches d, whereas the present embodiment is an approach by which division is performed until the inclusive dimension number reaches d-1. The following describes the effect on the worst time complexity caused by this fact.

First, like the approaches according to the k-d tree and the present embodiment, the number of divisions of nodes is estimated when the tree structure is balanced, with respect to a search performed by dividing the space into two while alternatingly switching the dimension for each depth. The time complexity is the worst when the number of spatial divisions is at the maximum. In other words, the time complexity is the worst when the two coverage regions generated by division performed once always overlap the query region.

Figure 11:
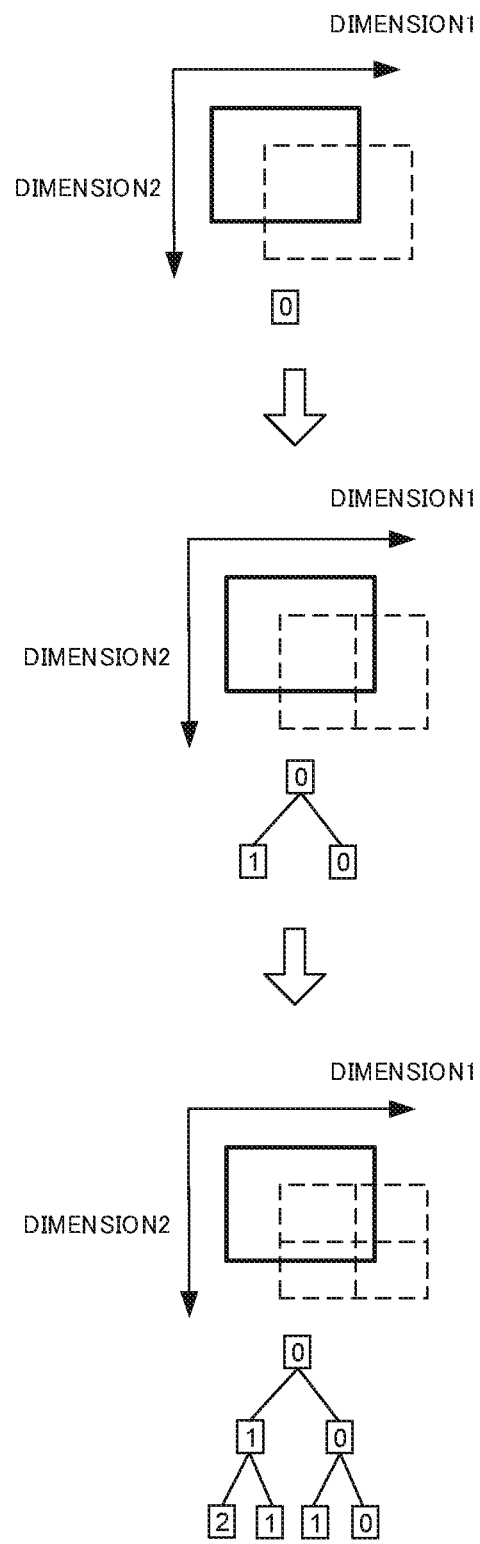
FIG. 11 is a diagram showing changes in the number of search nodes and the inclusive dimension number in a two-dimensional case.

FIG. 11 shows the relationship between the number of search nodes and the inclusive dimension number in the worst case. FIG. 11 is a diagram showing changes in the number of search nodes and the inclusive dimension number in a two-dimensional case. As shown in FIG. 11 one node in the tree structure corresponds to one search node. When the depth in the tree structure increases by one, the node is divided once, into two search nodes. The numbers on the nodes show the inclusive dimension numbers. It can be seen that the number of nodes whose inclusive dimension number is high increases as division is performed.

Here, division performed d times is considered as one set. A recursive formula that is true between $T_h(m)$ and $T_h(m-1)$ will be considered, where $T_h(m)$ denotes the number of nodes whose inclusive dimension number is h at a depth of m*d. If division is performed d times, one coverage region is divided into $2^d$ coverage regions. In this regard, the coverage region is invariably divided once with respect to each dimension. The inclusive dimension number does not increase even if division is performed with respect to a dimension that is already included. Therefore, in order to calculate the number of nodes whose inclusive dimension number is h at a depth of m*d, the number with which h-i dimensions are newly included with respect to the nodes whose inclusive dimension number is i ($\leq$h) at a depth of (m-1)*d is to be considered.

This recursive formula is as shown in Math. 1 below. Note that C(x,y) in Math. 1 below shows the number of combinations.

Math. 1

$$T_h(m) = \sum_{i=0}^{h} 2^i C(d-i, h-i) T_i(m-1)$$
$$= 2^h T_h(m-1) - 2^{h-1}(d-h+1) T_{h-1}(m-1) + \ldots + T_0(m-1)$$

From the above Math. 1, it can be seen that the total number of nodes increases by $2^d$ times when division is performed d times, and among these nodes, the number of nodes whose inclusive dimension number is h increases by $2^h$ times.

As a result of such division being repeated log(n)/d times, the search tree as a whole becomes a binary tree having a depth of log n, and the total number of nodes reaches O(n), and division is complete. Among these nodes, the number of nodes whose inclusive dimension number is h is $O(n^{(h/d)})$. Note that the number of nodes whose inclusive dimension number is 0 is O(log n).

Therefore, the following can be said. First, if the search is not terminated at all, the number of divisions is O(n) at maximum. If the division is terminated when the inclusive dimension number reaches d, the number of divisions is $O(n^{(d-1)/d})$. If the division is terminated when the inclusive dimension number reaches d-1, the number of divisions is $O(n^{(d-2)/d})$. According to the k-d tree, the division is terminated when the inclusive dimension number reaches d, and therefore the time complexity is $O(n^{(d-1)/d})$. This matches the conventionally known order.

This analysis of a k-d tree can be applied to the present embodiment. This is because the Z-value search node in the search according to the present embodiment divides the space with respect to each dimension alternatingly, and it is possible to estimate the time complexity using the same approach as that for k-d trees. However, a few modifications are required to fit to the present embodiment.

According to the present embodiment, the division is terminated when the inclusive dimension number reaches d-1, and therefore, the number of divisions, or the number of Z-value search nodes, is $O(n^{(d-2)/d})$ at maximum. However, the length of Z-values is d log n, and the Z-value search nodes may include nodes that have only one child node. Therefore, in the worst case, unnecessary calculation may be performed d log n times for each of the Z-value search nodes generated by division. When d is constant, the time complexity is O(log n).

Also, the time complexity of range_search_1d with respect to each Z-value search node is O(log n). Therefore, in the approach according to the present embodiment, the time complexity with respect to each of $O(n^{(d-2)/d})$ Z-value search nodes is O(log n)+O(log n), and the total time complexity is $O(n^{(d-2)/d} \log n)$.

However, the case in which d=2 is satisfied is a special case. The search loop is terminated when d−1=1 dimension is included, and therefore the number of divided nodes is proportional to O(log n), which is the number of nodes whose inclusive dimension number is 0. The time complexity of each node is O(log n), and therefore the total time complexity when d=2 is $O(\log^2 n)$.

The above description is of the case of a count query for outputting the number of points included in the query region. In the case of a report query for outputting a list of every included point, the computation time of each F point that is to be output is O(log n). FIG. 12 is a summary. As shown in FIG. 12, the present invention improves the order of time complexity compared to search processing performed using a k-d tree, and furthermore, unlike conventional wavelet trees, the present invention is applicable to case where the number of dimensions is three or more. FIG. 12 is a diagram showing a comparison between the present invention and a conventional approach in terms of time complexity.

Program

A program according to the embodiment of the present invention may be a program that causes a computer to execute the steps A1 to A5 shown in FIG. 6. The information processing device and the information processing method according to the present embodiment can be realized by installing this program to a computer and executing the program. If this is the case, the CPU (Central Processing Unit) of the computer functions as the search unit 10, the aggregation unit 20, the input receiving unit 30, and the output unit 40, and performs processing. Also, in the present embodiment, the storage unit 50 is realized by storing data files that constitute these units in a storage device provided for the computer, such as a hard disk.

Note that the program according to the present embodiment may be executed by a computer system that is built including a plurality of computers. If this is the case, for example, the computers may respectively function as the search unit 10, the aggregation unit 20, the input receiving unit 30, and the output unit 40. Also, the storage unit 50 may be built in a computer that is different from the computer that executes the program according to the present embodiment.

Figure 13:
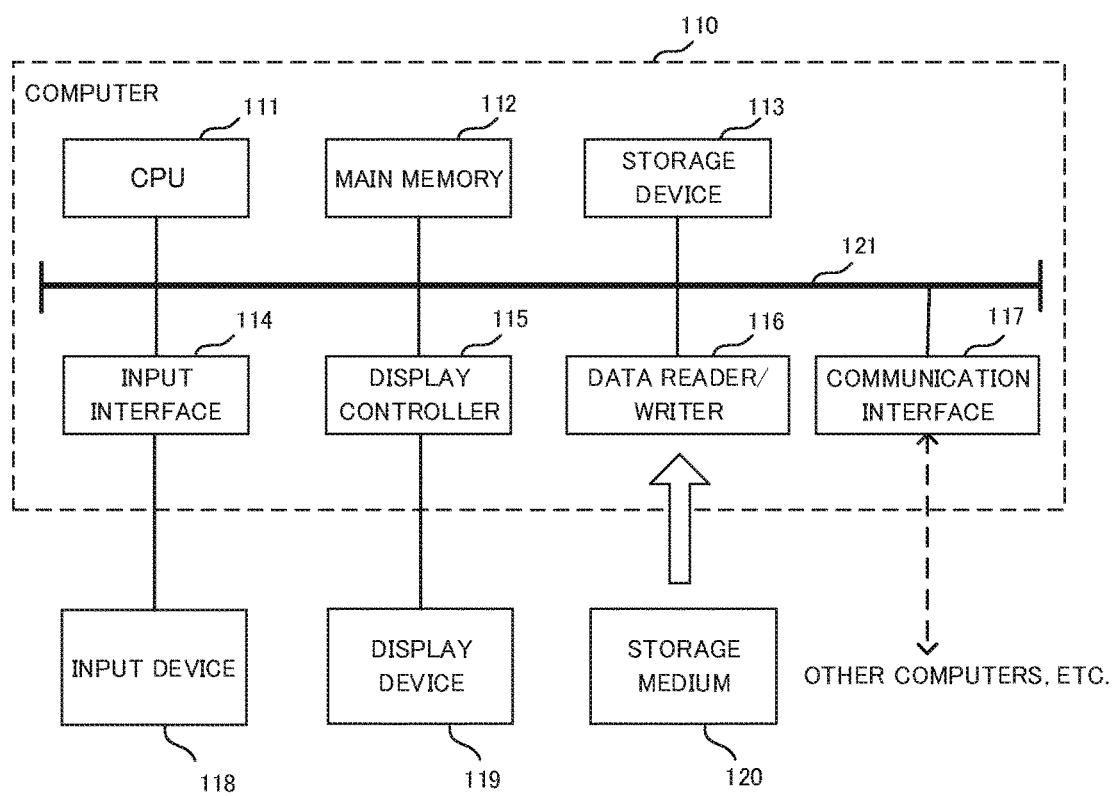
FIG. 13 is a block diagram showing an example of a computer that realizes the information processing device according to the embodiment of the present invention.

Here, a computer that realizes the information processing device 100 by executing the program according to the present embodiment will be described with reference to FIG. 13. FIG. 13 is a block diagram showing an example of a computer that realizes the information processing device according to the embodiment of the present invention.

As shown in FIG. 13, a computer 110 includes a CPU 111, a main memory 112, a storage device 113, an input interface 114, a display controller 115, a data reader/writer 116, and a communication interface 117. These units are connected to each other via a bus 121 such that data communication can be performed therebetween.

The CPU 111 loads, to the main memory 112, the program (code) according to the present embodiment stored in the storage device 113, and executes the program in a predetermined order to perform various kinds of computation. Typically, the main memory 112 is a volatile storage device such as a DRAM (Dynamic Random Access Memory). The program according to the present embodiment is provided in a state of being stored in a computer-readable storage medium 120. The program according to the present embodiment may be distributed through the internet connected via the communication interface 117.

Specific examples of the storage device 113 include, in addition to a hard disk drive, a semiconductor storage device such as a flash memory. The input interface 114 mediates data transmission between the CPU 111 and an input device 118 such as a keyboard or a mouse. The display controller 115 is connected to a display device 119, and controls display on the display device 119.

The data reader/writer 116 mediates data transmission between the CPU 111 and the storage medium 120, reads the program from the storage medium 120, and writes the results of processing by the computer 110 to the storage medium 120. The communication interface 117 mediates data transmission between the CPU 111 and other computers.

Specific examples of the storage medium 120 include a general-purpose semiconductor storage device such as a CF (Compact Flash™), a SD (Secure Digital), a magnetic storage medium such as a Flexible Disk, and an optical storage medium such as a CD-ROM (Compact Disk Read Only Memory).

Although part or all of the above-described embodiment can be expressed by Supplementary Notes 1 to 21 described below, the present invention is not limited to the description.

Supplementary Note 1

An information processing device that processes a data structure that represents a set of points included in a multidimensional space, comprising:

a search unit that, when a particular multidimensional region is specified as a query region, specifies, within a multidimensional region that builds up the data structure, regions that are expressed as portions shared between regions starting with feature value prefixes and regions starting with coordinate prefixes with respect to respective dimensions, and that are included in the query region, and outputs selected sections that are sections included in a data structure corresponding to the specified regions, the feature value prefixes being prefixes obtained from bit representations of feature values of the points, and the coordinate prefixes being prefixes obtained from bit representations of coordinates of the points with respect to a particular dimension; and an aggregation unit that calculates information regarding a set of points included in the query region, by using the selected sections.

Supplementary Note 2

The information processing device according to Supplementary Note 1, wherein the data structure is built such that the data structure is expressed by using a part of a bit representation of a subsequence obtained by, with respect to each dimension, extracting, using a coordinate sequence, only coordinates whose bit representations start with the same coordinate prefix, from the coordinate sequence with respect to the dimension, while maintaining the order, and such that a section included in the subsequence and satisfying a condition that bit representations of feature values of points corresponding to coordinates included in the section start with the feature value prefix can be specified, the coordinate sequence being obtained by, with respect to each dimension, taking out, from a feature value sequence, coordinates of the points with respect to the dimension in the same order as the feature values, and the feature value sequence being obtained by arranging the feature values of the set of points in the multidimensional space in ascending order, and the search unit outputs, as the selected sections, sections included in the subsequence and satisfying: a condition that bit representations of feature values of points corresponding to coordinates included in the sections start with the feature value prefix; and a condition that a set of points corresponding to the coordinates included in the sections is entirely included in the query region.

Supplementary Note 3

The information processing device according to Supplementary Note 2, wherein the search unit determines, regarding the section included in the subsequence and satisfying the condition that the bit representations of the feature values of the points corresponding to the coordinates included in the section start with the feature value prefix, whether or not the section satisfies the condition that the set of points corresponding to the coordinates included in the section is completely included in the query region, and if the section is determined as not being a section that is completely included in the query region, a second coordinate prefix is set by extending the coordinate prefix used for extracting the subsequence that has been subjected to the determination, and sections included in a second subsequence obtained by extracting coordinates using the second prefix, and satisfying: a condition that bit representations of feature values of points corresponding to coordinates included in the sections in the second subsequence start with the feature value prefix; and a condition that a set of points corresponding to coordinates included in the sections in the second subsequence is entirely included in the query region, are output as the selected sections.

Supplementary Note 4

The information processing device according to Supplementary Note 1, wherein the feature values of points are values that are based on bit representations obtained by alternatingly combining bit representations of coordinates of points in the respective dimensions.

Supplementary Note 5

The information processing device according to Supplementary Note 2, wherein the data structure is built such that: the data structure has a plurality of nodes; each of the plurality of nodes is expressed by using a sequence of bits that are taken out from a particular digit of bit representations of coordinates corresponding to the subsequence and that are arranged in the same order as the subsequence; and the data structure allows for specifying a section included in the subsequence and satisfying a condition that bit representations of feature values of points corresponding to coordinates included in the section start with the feature value prefix.

Supplementary Note 6

The information processing device according to Supplementary Note 1, wherein the aggregation unit calculates, as the information, a value of a sum of lengths of the selected sections, and outputs the value thus calculated.

Supplementary Note 7

The information processing device according to Supplementary Note 1, wherein the aggregation unit calculates, as the information, all coordinates included in the selected sections with respect to each dimension, and outputs all of the coordinates thus calculated.

Supplementary Note 8

An information processing method for processing a data structure that represents a set of points included in a multidimensional space, comprising:

(a) a step of, when a particular multidimensional region is specified as a query region, specifying, within a multidimensional region that builds up the data structure, regions that are expressed as portions shared between regions starting with feature value prefixes and regions respectively starting with coordinate prefixes with respect to dimensions, and that are included in the query region, the feature value prefixes being prefixes obtained from bit representations of feature values of the points, and the coordinate prefixes being prefixes obtained from bit representations of coordinates of the points with respect to a particular dimension;

(b) a step of outputting selected sections that are sections included in a data structure corresponding to the regions specified in the step (a); and (c) a step of calculating information regarding a set of points included in the query region, by using the selected sections.

Supplementary Note 9

The information processing method according to Supplementary Note 8, wherein the data structure is built such that the data structure is expressed by using a part of a bit representation of a subsequence obtained by, with respect to each dimension, extracting, using a coordinate sequence, only coordinates whose bit representations start with the same coordinate prefix, from the coordinate sequence with respect to the dimension, while maintaining the order, and such that a section included in the subsequence and satisfying a condition that bit representations of feature values of points corresponding to coordinates included in the section start with the feature value prefix can be specified, the coordinate sequence being obtained by, with respect to each dimension, taking out, from a feature value sequence, coordinates of the points with respect to the dimension in the same order as the feature values, and the feature value sequence being obtained by arranging the feature values of the set of points in the multidimensional space in ascending order, and in the step (a), sections included in the subsequence and satisfying: a condition that bit representations of feature values of points corresponding to coordinates included in the sections start with the feature value prefix; and a condition that a set of points corresponding to the coordinates included in the sections is entirely included in the query region, are output as the selected sections.

Supplementary Note 10

The information processing method according to Supplementary Note 9, wherein, in the step (a), regarding the section included in the subsequence and satisfying the condition that the bit representations of the feature values of the points corresponding to the coordinates included in the section start with the feature value prefix, whether or not the section satisfies the condition that the set of points corresponding to the coordinates included in the section is completely included in the query region is determined, and if the section is determined as not being a section that is completely included in the query region, a second coordinate prefix is set by extending the coordinate prefix used for extracting the subsequence that has been subjected to the determination, and sections included in a second subsequence obtained by extracting coordinates using the second prefix, and satisfying: a condition that bit representations of feature values of points corresponding to coordinates included in the sections in the second subsequence start with the feature value prefix; and a condition that a set of points corresponding to coordinates included in the sections in the second subsequence is entirely included in the query region, are output as the selected sections.

Supplementary Note 11

The information processing method according to Supplementary Note 8, wherein the feature values of points are values that are based on bit representations obtained by alternatingly combining bit representations of coordinates of points in the respective dimensions.

Supplementary Note 12

The information processing method according to Supplementary Note 9, wherein the data structure is built such that: the data structure has a plurality of nodes; each of the plurality of nodes is expressed by using a sequence of bits that are taken out from a particular digit of bit representations of coordinates corresponding to the subsequence and that are arranged in the same order as the subsequence; and the data structure allows for specifying a section included in the subsequence and satisfying a condition that bit representations of feature values of points corresponding to coordinates included in the section start with the feature value prefix.

Supplementary Note 13

The information processing method according to Supplementary Note 8, wherein, in the step (c), a value of a sum of lengths of the selected sections is calculated as the information, and the value thus calculated is output.

Supplementary Note 14

The information processing method according to Supplementary Note 8, wherein, in the step (c), all coordinates included in the selected sections with respect to each dimension are calculated as the information, and all of the coordinates thus calculated are output.

Supplementary Note 15

A computer-readable storage medium that stores a program for causing a computer to perform information processing to process a data structure that represents a set of points included in a multidimensional space, the program causing the computer to execute:

(a) a step of, when a particular multidimensional region is specified as a query region, specifying, within a multidimensional region that builds up the data structure, regions that are expressed as portions shared between regions starting with feature value prefixes and regions respectively starting with coordinate prefixes with respect to dimensions, and that are included in the query region, the feature value prefixes being prefixes obtained from bit representations of feature values of the points, and the coordinate prefixes being prefixes obtained from bit representations of coordinates of the points with respect to a particular dimension;

(b) a step of outputting selected sections that are sections included in a data structure corresponding to the regions specified in the step (a); and (c) a step of calculating information regarding a set of points included in the query region, by using the selected sections.

Supplementary Note 16

The computer-readable storage medium according to Supplementary Note 15, wherein the data structure is built such that the data structure is expressed by using a part of a bit representation of a subsequence obtained by, with respect to each dimension, extracting, using a coordinate sequence, only coordinates whose bit representations start with the same coordinate prefix, from the coordinate sequence with respect to the dimension, while maintaining the order, and such that a section included in the subsequence and satisfying a condition that bit representations of feature values of points corresponding to coordinates included in the section start with the feature value prefix can be specified, the coordinate sequence being obtained by, with respect to each dimension, taking out, from a feature value sequence, coordinates of the points with respect to the dimension in the same order as the feature values, and the feature value sequence being obtained by arranging the feature values of the set of points in the multidimensional space in ascending order, and in the step (a), sections included in the subsequence and satisfying: a condition that bit representations of feature values of points corresponding to coordinates included in the sections start with the feature value prefix; and a condition that a set of points corresponding to the coordinates included in the sections is entirely included in the query region, are output as the selected sections.

Supplementary Note 17

The computer-readable storage medium according to Supplementary Note 16, wherein, in the step (a), regarding the section included in the subsequence and satisfying the condition that the bit representations of the feature values of the points corresponding to the coordinates included in the section start with the feature value prefix, whether or not the section satisfies the condition that the set of points corresponding to the coordinates included in the section is completely included in the query region is determined, and if the section is determined as not being a section that is completely included in the query region, a second coordinate prefix is set by extending the coordinate prefix used for extracting the subsequence that has been subjected to the determination, and sections included in a second subsequence obtained by extracting coordinates using the second prefix, and satisfying: a condition that bit representations of feature values of points corresponding to coordinates included in the sections in the second subsequence start with the feature value prefix; and a condition that a set of points corresponding to coordinates included in the sections in the second subsequence is entirely included in the query region, are output as the selected sections.

Supplementary Note 18

The computer-readable storage medium according to Supplementary Note 15, wherein the feature values of points are values that are based on bit representations obtained by alternatingly combining bit representations of coordinates of points in the respective dimensions.

Supplementary Note 19

The computer-readable storage medium according to Supplementary Note 16, wherein the data structure is built such that: the data structure has a plurality of nodes; each of the plurality of nodes is expressed by using a sequence of bits that are taken out from a particular digit of bit representations of coordinates corresponding to the subsequence and that are arranged in the same order as the subsequence; and the data structure allows for specifying a section included in the subsequence and satisfying a condition that bit representations of feature values of points corresponding to coordinates included in the section start with the feature value prefix.

Supplementary Note 20

The computer-readable storage medium according to Supplementary Note 15, wherein, in the step (c), a value of a sum of lengths of the selected sections is calculated as the information, and the value thus calculated is output.

Supplementary Note 21

The computer-readable storage medium according to Supplementary Note 15, wherein, in the step (c), all coordinates included in the selected sections with respect to each dimension are calculated as the information, and all of the coordinates thus calculated are output.

Although the present invention is described above with reference to an embodiment, the present invention is not limited to the embodiment. Those skilled in the art will appreciate that various modifications can be made to the configurations and details of the present invention within the scope of the present invention.

This application is based upon and claims priority to Japanese Patent Application No. 2014-191102, filed on Sep. 19, 2014, the disclosure of which is incorporated in its entirety herein by reference.

INDUSTRIAL APPLICABILITY

As described above, according to the present invention, it is possible to realize an orthogonal range search with respect to a desired dimension d at a higher speed compared to cases of k-d trees, by using a data structure having a linear size. The present invention is useful in various fields in which necessary data needs to be searched for from among a large number of data sets.

DESCRIPTIONS OF REFERENCE NUMERALS

10: Search unit
20: Aggregation unit
30: Input receiving unit
40: Output unit
50: Storage unit
51: Data structure
100: Information processing device
110: Computer
111: CPU
112: Main memory
113: Storage device
114: Input interface
115: Display controller
116: Data reader/writer
117: Communication interface
118: Input device
119: Display device
120: Storage medium
121: Bus

What is claimed is:

1. An information processing device that processes a data structure that represents a set of points included in a multidimensional space, comprising:

a search unit that, when a particular multidimensional region is specified as a query region, specifies regions that are expressed as portions shared between regions starting with feature value prefixes and regions starting with coordinate prefixes with respect to respective dimensions, and that are included in the query region, and outputs selected sections that are sections included in a data structure corresponding to the specified regions, the feature value prefixes being prefixes obtained from bit representations of feature values of the points, and the coordinate prefixes being prefixes obtained from bit representations of coordinates of the points with respect to a particular dimension; and an aggregation unit that calculates information regarding a set of points included in the query region, by using the selected sections, wherein the data structure is built such that the data structure is expressed by using a part of a bit representation of a subsequence obtained by, with respect to each dimension, extracting, using a coordinate sequence, only coordinates whose bit representations start with the same coordinate prefix, from the coordinate sequence with respect to the dimension, while maintaining the order, and such that a section included in the subsequence and satisfying a condition that bit representations of feature values of points corresponding to coordinates included in the section start with the feature value prefix can be specified, the coordinate sequence being obtained by, with respect to each dimension, taking out, from a feature value sequence, coordinates of the points with respect to the dimension in the same order as the feature values, and the feature value sequence being obtained by arranging the feature values of the set of points in the multidimensional space in ascending order, and the search unit outputs, as the selected sections, sections included in the subsequence and satisfying: a condition that bit representations of feature values of points corresponding to coordinates included in the sections start with the feature value prefix; and a condition that a set of points corresponding to the coordinates included in the sections is entirely included in the query region.

2. The information processing device according to claim 1, wherein the search unit determines, regarding the section included in the subsequence and satisfying the condition that the bit representations of the feature values of the points corresponding to the coordinates included in the section start with the feature value prefix, whether or not the section satisfies the condition that the set of points corresponding to the coordinates included in the section is completely included in the query region, and if the section is determined as not being a section that is completely included in the query region, the search unit sets a second coordinate prefix by extending the coordinate prefix used for extracting the subsequence that has been subjected to the determination, and the search unit outputs, as the selected sections, sections included in a second subsequence obtained by extracting coordinates using the second prefix, and satisfying: a condition that bit representations of feature values of points corresponding to coordinates included in the sections in the second subsequence start with the feature value prefix; and a condition that a set of points corresponding to coordinates included in the sections in the second subsequence is entirely included in the query region.

3. The information processing device according to claim 1, wherein the feature values of points are values that are based on bit representations obtained by alternatingly combining bit representations of coordinates of points in the respective dimensions.

4. The information processing device according to claim 1, wherein the data structure is built such that: the data structure has a plurality of nodes; each of the plurality of nodes is expressed by using a sequence of bits that are taken out from a particular digit of bit representations of coordinates corresponding to the subsequence and that are arranged in the same order as the subsequence; and the data structure allows for specifying a section included in the subsequence and satisfying a condition that bit representations of feature values of points corresponding to coordinates included in the section start with the feature value prefix.

5. The information processing device according to claim 1, wherein the aggregation unit calculates, as the information, a value of a sum of lengths of the selected sections, and outputs the value thus calculated.

6. The information processing device according to any one of claim 1, wherein the aggregation unit calculates, as the information, all coordinates included in the selected sections with respect to each dimension, and outputs all of the coordinates thus calculated.

7. An information processing method for processing a data structure that represents a set of points included in a multidimensional space, comprising:
(a) a step of, when a particular multidimensional region is specified as a query region, specifying, within a multidimensional region that builds up the data structure, regions that are expressed as portions shared between regions starting with feature value prefixes and regions respectively starting with coordinate prefixes with respect to dimensions, and that are included in the query region, the feature value prefixes being prefixes obtained from bit representations of feature values of the points, and the coordinate prefixes being prefixes obtained from bit representations of coordinates of the points with respect to a particular dimension;
(b) a step of outputting selected sections that are sections included in a data structure corresponding to the regions specified in the step (a); and
(c) a step of calculating information regarding a set of points included in the query region, by using the selected sections,
wherein the data structure is built such that the data structure is expressed by using a part of a bit representation of a subsequence obtained by, with respect to each dimension, extracting, using a coordinate sequence, only coordinates whose bit representations start with the same coordinate prefix, from the coordinate sequence with respect to the dimension, while maintaining the order, and such that a section included in the subsequence and satisfying a condition that bit representations of feature values of points corresponding to coordinates included in the section start with the feature value prefix can be specified, the coordinate sequence being obtained by, with respect to each dimension, taking out, from a feature value sequence, coordinates of the points with respect to the dimension in the same order as the feature values, and the feature value sequence being obtained by arranging the feature values of the set of points in the multidimensional space in ascending order, and
the step of outputting outputs, as the selected sections, sections included in the subsequence and satisfying: a condition that bit representations of feature values of points corresponding to coordinates included in the sections start with the feature value prefix; and a condition that a set of points corresponding to the coordinates included in the sections is entirely included in the query region.

8. A non transitory computer-readable storage medium that stores a program for causing a computer to perform information processing to process a data structure that represents a set of points included in a multidimensional space, the program causing the computer to execute:
(a) a step of, when a particular multidimensional region is specified as a query region, specifying, within a multidimensional region that builds up the data structure, regions that are expressed as portions shared between regions starting with feature value prefixes and regions respectively starting with coordinate prefixes with respect to dimensions, and that are included in the query region, the feature value prefixes being prefixes obtained from bit representations of feature values of the points, and the coordinate prefixes being prefixes obtained from bit representations of coordinates of the points with respect to a particular dimension;
(b) a step of outputting selected sections that are sections included in a data structure corresponding to the regions specified in the step (a); and
(c) a step of calculating information regarding a set of points included in the query region, by using the selected sections,
wherein the data structure is built such that the data structure is expressed by using a part of a bit representation of a subsequence obtained by, with respect to each dimension, extracting, using a coordinate sequence, only coordinates whose bit representations start with the same coordinate prefix, from the coordinate sequence with respect to the dimension, while maintaining the order, and such that a section included in the subsequence and satisfying a condition that bit representations of feature values of points corresponding to coordinates included in the section start with the feature value prefix can be specified, the coordinate sequence being obtained by, with respect to each dimension, taking out, from a feature value sequence, coordinates of the points with respect to the dimension in the same order as the feature values, and the feature value sequence being obtained by arranging the feature values of the set of points in the multidimensional space in ascending order, and
the step of outputting outputs, as the selected sections, sections included in the subsequence and satisfying: a condition that bit representations of feature values of points corresponding to coordinates included in the sections start with the feature value prefix; and a condition that a set of points corresponding to the coordinates included in the sections is entirely included in the query region.

* * * * *